United States Patent
Asano

(10) Patent No.: US 9,550,480 B2
(45) Date of Patent: Jan. 24, 2017

(54) VEHICLE BRAKE HYDRAULIC PRESSURE CONTROL APPARATUS AND ROAD SURFACE FRICTION COEFFICIENT ESTIMATING DEVICE

(71) Applicant: NISSIN KOGYO CO., LTD., Nagano (JP)

(72) Inventor: Kiyonori Asano, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 97 days.

(21) Appl. No.: 13/653,876

(22) Filed: Oct. 17, 2012

(65) Prior Publication Data

US 2013/0103279 A1 Apr. 25, 2013

(30) Foreign Application Priority Data

Oct. 21, 2011 (JP) ................. 2011-231712
Oct. 21, 2011 (JP) ................. 2011-231717

(51) Int. Cl.
*B60T 8/24* (2006.01)
*B60T 8/1763* (2006.01)
(Continued)

(52) U.S. Cl.
CPC .......... *B60T 8/17636* (2013.01); *B60T 8/1755* (2013.01); *B60T 8/17616* (2013.01);
(Continued)

(58) Field of Classification Search
None
See application file for complete search history.

(56) References Cited

U.S. PATENT DOCUMENTS 4,809,181 A * 2/1989 Ito et al. .................. 701/70
4,971,174 A * 11/1990 Abe et al. ................ 180/408
(Continued)

FOREIGN PATENT DOCUMENTS

CN 1519149 A 8/2004
CN 101323300 A 12/2008
(Continued)

OTHER PUBLICATIONS

Japanese Office Action for Patent Application No. 2011-231712 dated Aug. 27, 2013, 9 pages.
(Continued)

*Primary Examiner* — John R Olszewski
*Assistant Examiner* — Nicholas K Wiltey
(74) *Attorney, Agent, or Firm* — Andrew M. Calderon; Roberts Mlotkowski Safran Cole & Calderon, P.C.

(57) ABSTRACT

One embodiment provides a vehicle brake hydraulic controller including: an antilock braking controlling module configured to perform an antilock braking control in which a brake hydraulic pressure applied to wheel brakes is reduced under the condition that a slip-related amount has reached a pressure reduction threshold value; and a turning judging module configured to judge whether a vehicle is turning based on a steering angle, wherein, when the antilock braking control is performed and in the case that the turning judging module judges that the vehicle is turning, the antilock braking controlling module performs a turning pressure reduction control so as to: change the pressure reduction threshold values to be more easily reached by the slip-related amount than at the time of straight running; and change the pressure reduction amounts to be larger than that at the time of straight running.

24 Claims, 12 Drawing Sheets

(51) Int. Cl.
*B60T 8/26* (2006.01)
*B60T 8/176* (2006.01)
*B60T 8/1755* (2006.01)
*B60T 8/1761* (2006.01)

(52) U.S. Cl.
CPC ....... *B60T 2201/16* (2013.01); *B60T 2210/12* (2013.01); *B60T 2270/313* (2013.01)

(56) References Cited

U.S. PATENT DOCUMENTS

| | | | |
|---|---|---|---|
| 4,989,922 A * | 2/1991 | Pickenhahn | B60T 8/1706 180/219 |
| 5,213,398 A * | 5/1993 | Becker | 303/157 |
| 5,219,212 A * | 6/1993 | Shimada et al. | 303/148 |
| 5,251,137 A * | 10/1993 | Chin et al. | 701/72 |
| 5,341,297 A * | 8/1994 | Zomotor et al. | 701/72 |
| 5,478,143 A * | 12/1995 | Doden et al. | 303/150 |
| 5,669,677 A * | 9/1997 | Fischer | 303/147 |
| 5,694,321 A * | 12/1997 | Eckert et al. | 701/91 |
| 5,711,024 A * | 1/1998 | Wanke | 701/82 |
| 5,711,025 A * | 1/1998 | Eckert et al. | 701/83 |
| 5,749,062 A * | 5/1998 | Yamamoto et al. | 701/72 |
| 5,774,821 A * | 6/1998 | Eckert | 701/78 |
| 5,862,503 A * | 1/1999 | Eckert et al. | 701/78 |
| 5,863,105 A * | 1/1999 | Sano | 303/146 |
| 6,012,010 A * | 1/2000 | Batistic et al. | 701/72 |
| 6,081,761 A * | 6/2000 | Harada et al. | 701/72 |
| 6,954,690 B2 * | 10/2005 | Watanabe et al. | 701/71 |
| 7,974,761 B2 * | 7/2011 | Maeda et al. | 701/70 |
| 8,224,546 B2 * | 7/2012 | Terasaka | 701/73 |
| 8,315,758 B2 * | 11/2012 | Takenaka et al. | 701/29.2 |
| 2001/0032045 A1 * | 10/2001 | Hano et al. | 701/80 |
| 2002/0072841 A1 * | 6/2002 | Kogure | 701/80 |
| 2002/0156566 A1 * | 10/2002 | Ishikawa et al. | 701/71 |
| 2002/0185913 A1 * | 12/2002 | Watanabe | B60T 8/1755 303/139 |
| 2003/0214182 A1 * | 11/2003 | Sauter et al. | 303/148 |
| 2004/0267429 A1 * | 12/2004 | Matsuno et al. | 701/80 |
| 2006/0122760 A1 * | 6/2006 | Terasaka | 701/73 |
| 2007/0219700 A1 * | 9/2007 | Makiyama | 701/72 |
| 2009/0101428 A1 * | 4/2009 | Itoh | 180/197 |
| 2009/0118906 A1 * | 5/2009 | Tanaka | 701/41 |
| 2011/0077834 A1 * | 3/2011 | Kudo et al. | 701/72 |
| 2012/0109484 A1 * | 5/2012 | Onoda et al. | 701/72 |
| 2012/0179349 A1 * | 7/2012 | Yamakado et al. | 701/89 |

FOREIGN PATENT DOCUMENTS

| | | |
|---|---|---|
| CN | 101559764 A | 10/2009 |
| DE | 19522632 A1 | 1/1997 |
| DE | 19820107 A1 | 6/1999 |
| EP | 0522615 A2 | 1/1993 |
| JP | 60248466 | 12/1985 |
| JP | 62253560 | 11/1987 |
| JP | 04110262 | 4/1992 |
| JP | 06027407 | 4/1994 |
| JP | 08104215 | 4/1996 |
| JP | 11115721 | 4/1999 |

OTHER PUBLICATIONS

Extended European Search Report for Application No. 12189222.8-2423, dated Jan. 30, 2013, 6 pages.
Chinese Office Action for Patent Application No. 201210566476.2 dated Jan. 19, 2015, 22 pages.

* cited by examiner

VEHICLE BRAKE HYDRAULIC PRESSURE CONTROL APPARATUS AND ROAD SURFACE FRICTION COEFFICIENT ESTIMATING DEVICE

CROSS-REFERENCE TO RELATED APPLICATION(S)

This application claims priority (priorities) from Japanese Patent Application(s) No. 2011-231712 filed on Oct. 21, 2011, and No. 2011-231717 filed on Oct. 21; 2011, the entire contents of which are incorporated herein by reference.

FIELD

The present invention relates to a vehicle brake hydraulic controller, more particularly, to a vehicle brake hydraulic controller capable of performing antilock braking control.

The present invention also relates to a road surface friction coefficient estimating device for estimating a road surface friction coefficient and a vehicle brake hydraulic controller for performing brake hydraulic pressure control using the estimated road surface friction coefficient.

BACKGROUND

JP-S62-253560-A discloses a vehicle brake hydraulic controller in which the target slip ratio at the time of vehicle braking while turning is made lower than that at the time of braking while running straight to suppress the side skidding of the vehicle and to improve steering performance thereof.

However, since only the target slip ratio at the time of braking while turning is made lower in the conventional technology, traceability along a running line cannot be satisfied sufficiently.

On the other hand, JP-H11-115721-A discloses a road surface friction coefficient estimating device which estimates a road surface friction coefficient from lateral acceleration in the case that the steering angle is larger than a given value and estimates a road surface friction coefficient from longitudinal acceleration in the case that the steering angle is smaller than the given value.

However, the road surface friction coefficient can be estimated accurately from lateral acceleration only when steering is performed in attempting to generate lateral acceleration larger than the maximum lateral acceleration that can be generated at the friction coefficient of the road surface on which a vehicle is running (at the time of steering exceeding the limit of road surface conditions), that is, only when the maximum lateral acceleration is generated in the vehicle. In contrast, in the conventional technology, whether lateral acceleration is used or not is simply determined depending on whether the steering angle is larger than the given value or not. Hence, for example, lateral acceleration may be used sometimes in a state in which the maximum lateral acceleration is not generated. In this case, a value smaller than the actual road surface friction coefficient may be estimated.

SUMMARY

One object of the present invention is to provide a vehicle brake hydraulic controller capable of improving traceability along a running line.

Claim 1 defines a vehicle brake hydraulic controller including:

an antilock braking controlling module configured to perform an antilock braking control in which a brake hydraulic pressure applied to wheel brakes is reduced under the condition that a slip-related amount has reached a pressure reduction threshold value, the slip-related amount being calculated using a vehicle speed and a wheel speed; and a turning judging module configured to judge whether a vehicle is turning based on a steering angle, wherein, when the antilock braking control is performed and in the case that the turning judging module judges that the vehicle is turning, the antilock braking controlling module performs a turning pressure reduction control so as to:

change the pressure reduction threshold values to be more easily reached by the slip-related amount than at the time of straight running; and change the pressure reduction amounts to be larger than that at the time of straight running.

With this configuration, in the case that the vehicle is turning, the pressure reduction timing can be advanced by appropriately changing the pressure reduction threshold values. Furthermore, the wheel speed can be made close to the vehicle speed quickly by making the pressure reduction amounts larger than those at the time of straight running. Hence, large turning forces can be generated, whereby traceability along a running line can be improved.

Claim 2 defines, based on claim 1, the controller, further including:

a turning state judging module configured to judge whether the vehicle is in an under-steering state, a neutral-steering state or an over-steering state, wherein the antilock braking controlling module performs:

the turning pressure reduction control only for the front wheels in the case that the turning state judging module judges that the vehicle is in the under-steering state;

the turning pressure reduction control for the front wheels and the rear wheels in the case that the turning state judging module judges that the vehicle is in the neutral-steering state; and the turning pressure reduction control only for the rear wheels in the case that the turning state judging module judges that the vehicle is in the over-steering state.

With this configuration, the wheels to be subjected to the turning pressure reduction control are switched depending on the turning state of the vehicle, whereby large turning forces are generated while the stability of the vehicle is improved and the traceability along a running line can be improved.

Claim 3 defines, based on claim 2, the controller, wherein, in the turning pressure reduction control that is performed only for the front wheels in the under-steering state, the pressure reduction threshold value is adjusted to be more easily reached than at the neutral-steering state, and the pressure reduction amount is adjusted to be larger more than at the neutral-steering state.

With this configuration, the pressure reduction threshold value and the pressure reduction amount of the front wheels in the under-steering state are changed significantly so as to be larger than those in the neutral-steering state. Hence, larger turning forces are generated at the front wheels, whereby the traceability along a running line can be improved while the under-steering state is eliminated.

Claim 4 defines, based on claim 2, the controller, wherein, in the turning pressure reduction control that is performed only for the front wheels in the under-steering state, the pressure reduction threshold value of the outer wheel at the time of turning is adjusted to be more easily reached than the pressure reduction threshold value of the inner wheel at the time of turning.

With this configuration, the pressure reduction threshold value of the outer wheel to which the weight of the vehicle is applied more heavily is adjusted to be more easily reached than the pressure reduction threshold value of the inner wheel. Hence, the turning force of the outer wheel can be used more effectively and the under-steering state can be eliminated more easily.

Claim 5 defines, based on claim 2, the controller, wherein, in the turning pressure reduction control that is performed only for the rear wheels in the over-steering state, the pressure reduction threshold value is adjusted to be more easily reached than at the neutral-steering state, and the pressure reduction amount is adjusted to be larger than at the neutral-steering state.

With this configuration, the pressure reduction threshold value and the pressure reduction amount of the rear wheels in the over-steering state are changed so as to be larger than those in the neutral-steering state. Hence, the side skidding of the rear wheels can be eliminated, whereby the traceability along a running line can be improved while the under-steering state is eliminated.

Claim 6 defines, based on claim 2, the controller, wherein the turning state judging module includes:
a normative yaw rate calculation section configured to calculate a normative yaw rate using the steering angle and the vehicle speed;
a road surface limit yaw rate calculation section configured to calculate a road surface limit yaw rate using a lateral acceleration and the vehicle speed; and
a target yaw rate calculation section configured to calculate a target yaw rate from the normative yaw rate and the road surface limit yaw rate,
wherein the turning state judging module compares the target yaw rate with an actual yaw rate actually applied to the vehicle to thereby judge:
that the vehicle is in the under-steering state in the case that the actual yaw rate is smaller than a value obtained by subtracting a first given value from the target yaw rate;
that the vehicle is in the over-steering state in the case that the actual yaw rate is larger than a value obtained by adding a second given value to the target yaw rate; and
that the vehicle is in the neutral-steering state in the case that the vehicle is not judged to be in the under-steering state or the over-steering state.

With this configuration, the turning state of the vehicle can be distinguished easily based on the deviation between the target yaw rate and the actual yaw rate, and more appropriate control can be performed depending on the type of vehicle by changing the first given value and the second given value depending on the type of vehicle.

Claim 7 defines, based on claim 1, the controller, wherein the slip-related amount is a slip amount obtained by subtracting the wheel speed from the vehicle speed, and
wherein, when the slip amount becomes larger than the pressure reduction threshold value, the antilock braking controlling module reduces the brake hydraulic pressure applied to the wheel brakes.

With this configuration, whether the pressure reduction is required in the antilock braking control can be judged based on the slip amount, that is, the deviation between the vehicle speed and the wheel speed.

Claim 8 defines, based on claim 1, the controller, further including:

a road surface friction coefficient judging module configured to judge whether a road surface on which the vehicle is running is at least a low friction coefficient road surface, and
wherein the antilock braking controlling module performs the turning pressure reduction control only in the case that the road surface is judged to be the low friction coefficient road surface.

With this configuration, when the vehicle is turning on the low friction coefficient road surface, the traceability along a running line is apt to be worsened particularly. Hence, the turning pressure reduction control is performed to particularly deal with this situation, whereby large turning forces are generated on the low friction coefficient road surface and the traceability along the running line can be improved, Claim 9 defines, based on claim 8, the controller, wherein the road surface friction coefficient judging module includes:
a first estimating module configured to estimate a first road surface friction coefficient based on a lateral acceleration;
a second estimating module configured to estimate a second road surface friction coefficient based on a longitudinal acceleration;
a selecting module configured to select either the first road surface friction coefficient or the second road surface friction coefficient as a road surface friction coefficient of the road surface; and
a low $\mu$ road judging module configured to judge that the road surface is the low friction coefficient road surface when the road surface friction coefficient selected by the selecting module is smaller than a fourth given value,
wherein the selecting module has a limit steering judgment section configured to judge whether steering exceeding the limit of road surface conditions is performed based on at least the steering angle and the vehicle speed, and
wherein the selecting module selects:
the first road surface friction coefficient or the second road surface friction coefficient, whichever smaller, as the road surface friction coefficient when limit steering judgment section judges that steering exceeding the limit of road surface conditions is performed; and
the second road surface friction coefficient as the road surface friction coefficient when limit steering judgment section judges that steering exceeding the limit of road surface conditions is not performed.

With this configuration, the first road surface friction coefficient estimated from the lateral acceleration only at the time of steering exceeding the limit of road surface conditions (when steering is performed in attempting to generate lateral acceleration larger than the maximum lateral acceleration that can be generated at the friction coefficient of the road surface on which the vehicle is running) can be selected. Hence, the use of the lateral acceleration in a state in which no maximum lateral acceleration is generated can be prevented, and the road surface friction coefficient is estimated accurately, whereby whether the road surface is a low friction coefficient road surface can be properly judged according to the road surface friction coefficient.

Thus, with the present invention, the traceability along a running line can be improved.

Another object of the present invention is to provide a road surface friction coefficient estimating device and a vehicle brake hydraulic controller capable of accurately estimating the road surface friction coefficient of the road surface on which a vehicle is running based on lateral acceleration.

Claim 10 defines, based on claim 8, the controller,
wherein the road surface friction coefficient judging module includes:
a first estimating module configured to estimate a first road surface friction coefficient based on a lateral acceleration;
a second estimating module configured to estimate a second road surface friction coefficient based on a longitudinal acceleration; and
a selecting module configured to select either the first road surface friction coefficient or the second road surface friction coefficient as a road surface friction coefficient of the road surface,
wherein the selecting module has a limit steering judgment section configured to judge whether steering exceeding the limit of road surface conditions is performed based on at least the steering angle and the vehicle speed, and
wherein the selecting module selects:
the first road surface friction coefficient or the second road surface friction coefficient, whichever smaller, as the road surface friction coefficient when limit steering judgment section judges that steering exceeding the limit of road surface conditions is performed; and
the second road surface friction coefficient as the road surface friction coefficient when limit steering judgment section judges that steering exceeding the limit of road surface conditions is not performed.

With this configuration, the first road surface friction coefficient estimated from lateral acceleration can be selected only at the time of steering exceeding the limit of road surface conditions, whereby the use of the lateral acceleration in a state in which no maximum lateral acceleration is generated can be prevented and the road surface friction coefficient can be estimated accurately.

Claim 11 defines, based on claim 10, the controller,
wherein the limit steering judgment section includes:
a normative yaw rate calculation section configured to calculate a normative yaw rate from the steering angle and the vehicle speed;
a road surface limit yaw rate calculation section configured to calculate a road surface limit yaw rate from a lateral acceleration and the vehicle speed; and
a yaw rate judgment section configured to judge whether the deviation obtained by subtracting the road surface limit yaw rate from the normative yaw rate is larger than a third given value, and
wherein the limit steering judgment section judges:
that steering exceeding the limit of road surface conditions is performed in the case that the deviation is larger than the third given value; and
that steering exceeding the limit of road surface conditions is not performed in the case that the deviation is not larger than the third given value.

With this configuration, whether steering exceeding the limit of road surface conditions is performed can be judged accurately using the normative yaw rate serving as a value genuinely corresponding to the steering (steering angle) of the driver and the road surface limit yaw rate determined from the current lateral acceleration and the vehicle speed.

Claim 12 defines, based on claim 10, the controller,
wherein the first estimating module calculates the first road surface friction coefficient from a lateral acceleration filter value obtained by performing a filtering process in which an absolute value of the lateral acceleration is made difficult to be changed to the decreasing side.

With this configuration, the problem that the road surface friction coefficient is mistakenly estimated to be small because the lateral acceleration fluctuates due to disturbance or the like or the steering wheel is turned quickly in one direction and then in the other direction can be prevented.

Claim 13 defines, based on claim 10, the controller,
wherein the road surface friction coefficient judging module further includes:
a low μ road judging module configured to judge whether the road surface is the low friction coefficient road surface,
wherein the low μ road judging module includes:
a first judgment section configured to judge whether a first condition that the road surface friction coefficient is smaller than a fourth given value is satisfied; and
at least one of a second judgment section configured to judge whether a second condition that an estimated lateral acceleration calculated based on an actual yaw rate actually applied to the vehicle is smaller than a fifth given value is satisfied, and a third judgment section configured to judge whether a third condition that a locking hydraulic pressure in the antilock braking control is smaller than a sixth given value is satisfied, and
wherein the low μ road judging module judges that the road surface is the low friction coefficient road surface when the first condition and at least one of the second and third conditions are satisfied.

With this configuration, whether the road surface is a low friction coefficient road surface is judged using not only the road surface friction coefficient estimated by the road surface friction coefficient estimating device but also other conditions (the estimated lateral acceleration estimated from the actual yaw rate is small or the locking hydraulic pressure is small), whereby the judgment as to whether the road surface is a low friction coefficient road surface can be performed accurately.

Claim 14 defines, based on claim 13, the controller,
wherein the road surface friction coefficient judging module estimates the road surface friction coefficient using an actual lateral acceleration obtained by a lateral acceleration sensor.

With this configuration, even in the case that the road surface friction coefficient is estimated to have a mistaken value because the lateral acceleration sensor is defective, the fact that the estimated value is a mistaken value can be judged by other conditions (such as a condition of the estimated lateral acceleration or a condition of locking hydraulic pressure).

Claim 15 defines, based on claim 13, the controller,
wherein the second judgment section calculates:
a tentatively estimated lateral acceleration obtained from the absolute value of the actual yaw rate and the vehicle speed; and
the estimated lateral acceleration obtained by subjecting the tentatively estimated lateral acceleration to a filtering process in which the tentatively estimated lateral acceleration is made difficult to be changed only to the decreasing side.

With this configuration, the problem that the estimated lateral acceleration is mistakenly estimated to be smell because the yaw rate fluctuates due to disturbance or the like or the steering wheel is turned quickly in one direction and then in the other direction can be prevented.

Claim 16 defines, based on claim 13, the controller,
wherein the third judgment section judges that the third condition is satisfied when the locking hydraulic pressures of the right front wheel and the left front wheel are respectively smaller than the sixth given value that is the same for all the wheels or different for the respective wheels.

With this configuration, the locking hydraulic pressures of the front wheels that are easily affected by the state of the road surface because loads are applied thereto at the time of braking are used and the locking hydraulic pressures of the left and right wheels are judged individually, whereby the judgment as to whether the road surface is a low friction coefficient road surface based on the locking hydraulic pressures can be performed securely.

Thus, with the pressure reduction, the estimation of the road surface friction coefficient based on lateral acceleration can be performed accurately.

DETAILED DESCRIPTION

An embodiment will be described referring to the accompanying drawings.

Figure 1:
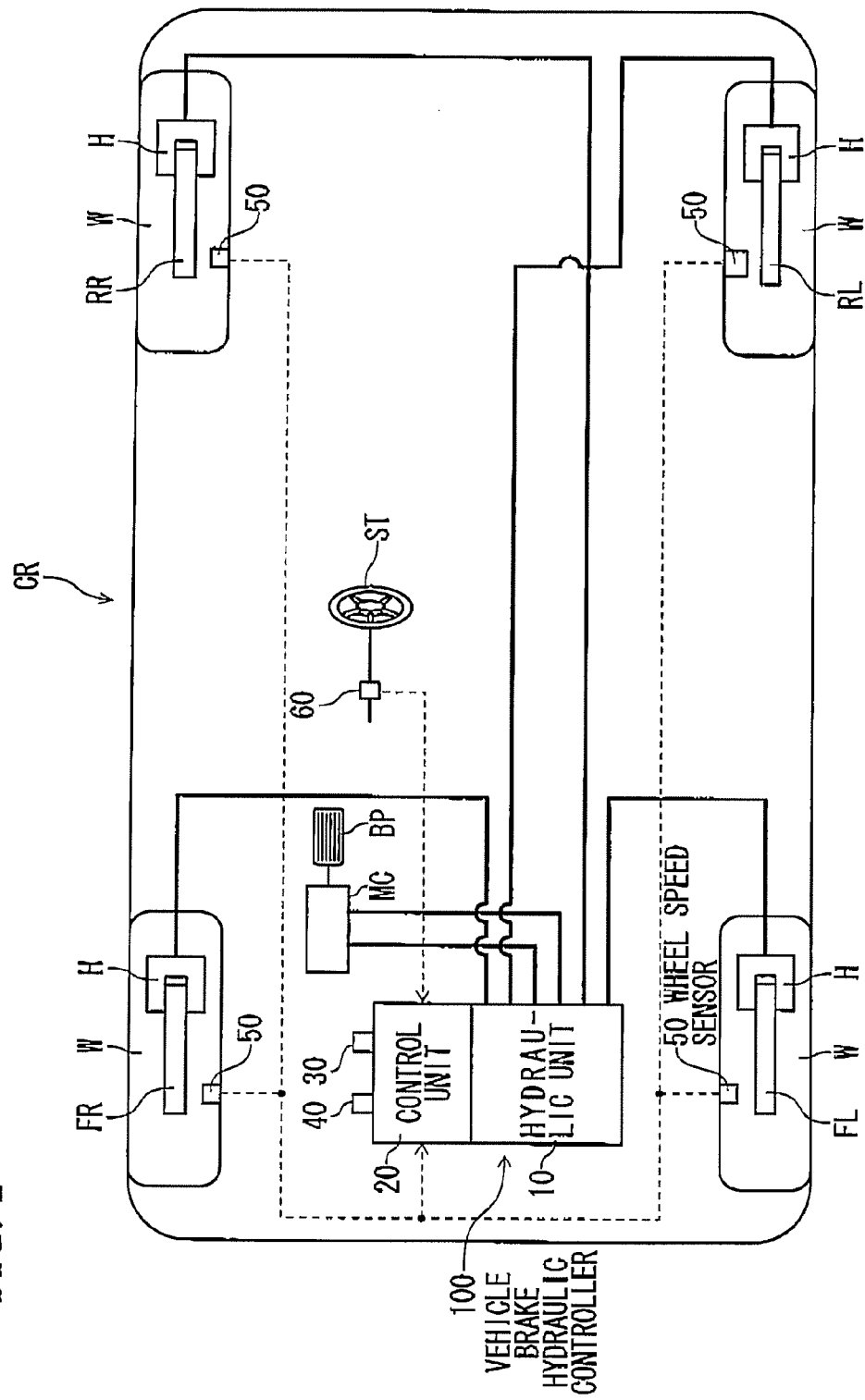
FIG. 1 illustrates a vehicle having a vehicle brake hydraulic controller according to an embodiment.

As shown in FIG. 1, a vehicle brake hydraulic controller 100 is used to appropriately control a braking force (brake hydraulic pressure) applied to each wheel W of a vehicle CR. The vehicle brake hydraulic controller 100 includes a hydraulic unit 10 provided with fluid passages (hydraulic passages) and various components and a control unit 20 for appropriately controlling the various components inside the hydraulic unit 10. A lateral acceleration sensor 30, a yaw rate sensor 40, wheel speed sensors 50 and a steering angle sensor 60 are connected to the control unit 20 so that signals from the respective sensors 30 to 60 axe input to the control unit 20.

The lateral acceleration sensor 30 detects the acceleration (actual lateral acceleration) applied in the lateral direction of the vehicle CR, and is integrally provided on the control unit 20.

The yaw rate sensor 40 detects the turning angular velocity (actual yaw rate) of the vehicle CR, and is integrally provided on the control unit 20.

The wheel speed sensor 50 detects the wheel speed of each wheel W, and is provided for each wheel W.

The steering angle sensor 60 detects the steering angle of the steering wheel ST of the vehicle CR, and is provided on the rotation shaft of the steering wheel ST.

The control unit 20 includes, for example, a CPU, a RAM, a ROM and input/output circuits, and performs control by performing various kinds of arithmetic processing based on the input from the respective sensors 30 to 60 and programs and data stored in the ROM.

Wheel cylinders H are hydraulic devices. The wheel cylinders H convert brake hydraulic pressure which is generated by a master cylinder MC and transmitted through the vehicle brake hydraulic control apparatus 100 to the actuating force of each of wheel brakes FR, FL, RR and RL provided on the respective wheels W. The wheel cylinders H are connected to the hydraulic unit 10 through respective pipes.

Figure 2:
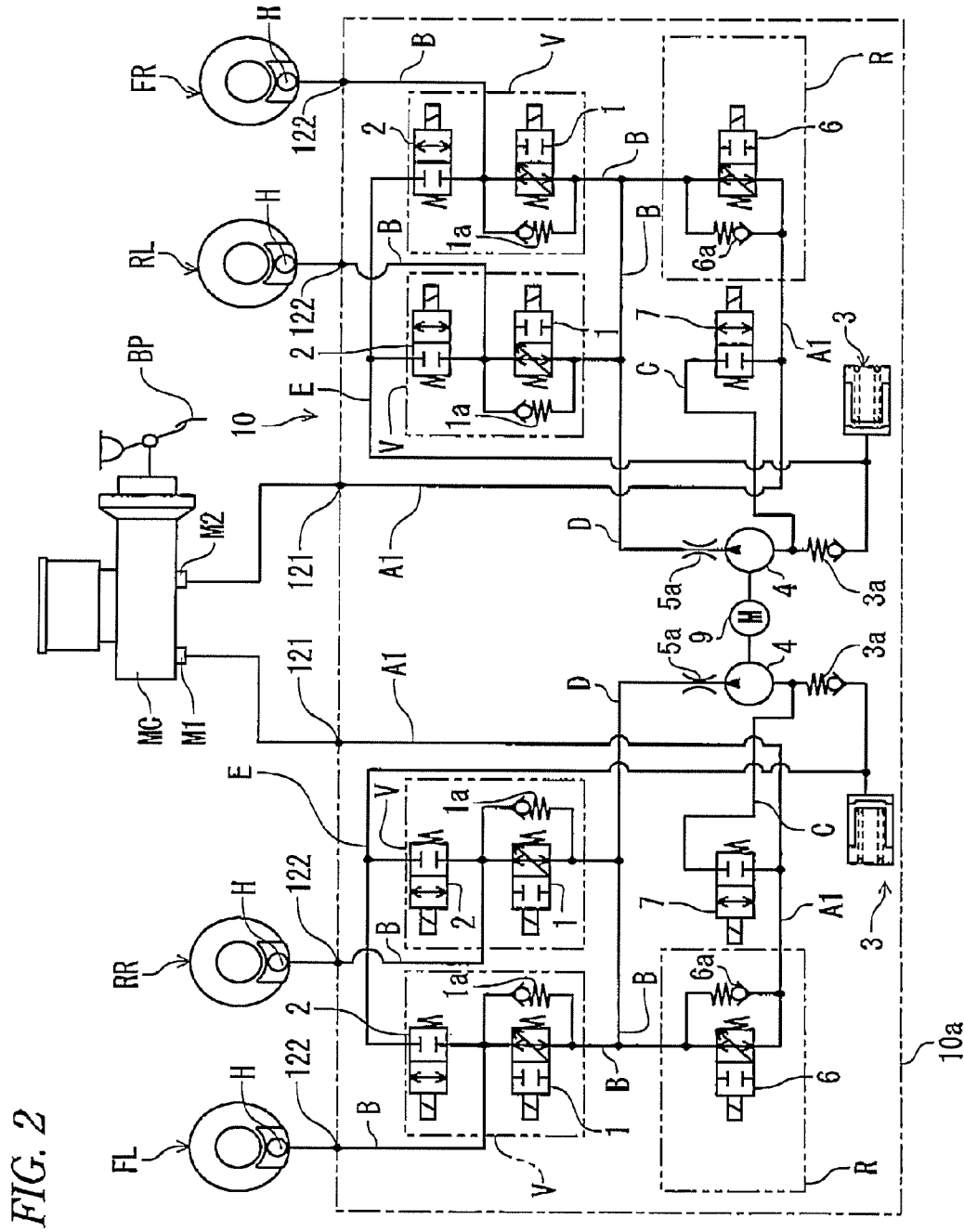
FIG. 2 illustrates a hydraulic circuit of the vehicle brake hydraulic controller.

As shown in FIG. 2, the hydraulic unit 10 is disposed between the master cylinder MC serving as a hydraulic pressure source for generating brake hydraulic pressure depending on the depressing force applied to the brake pedal BP of the vehicle by the driver and the wheel brakes FR, FL, RR and RL. The hydraulic unit 10 is formed of a pump body 10a serving as a base body having fluid passages through which brake fluid flows, a plurality of inlet valves 1 and a plurality of outlet valves 2 disposed in the fluid passages, etc. The two output ports M1 and M2 of the master cylinder MC are connected to the inlet ports 121 of the pump body 10a, and the outlet ports 122 of the pump body 10a are respectively connected to the wheel brakes FR, FL, RR and RL. The inlet ports 121 are usually communicated to the outlet ports 122 via the fluid passages inside the pump body 10a, so that the depressing force applied to the brake pedal BP is transmitted to each of the wheel brakes FL, RR, RL and FR.

The fluid passage starting from the output port M1 leads to the front left wheel brake FL and the rear right wheel brake RR, and the fluid passage starting from the output port M2 leads to the front right wheel brake FR and the rear left wheel brake RL. In the following description, the fluid passage starting from the output port M1 is referred to as a "first system," and the fluid passage starting from the output port M2 is referred to as a "second system."

The first system is provided with two control valve units V respectively corresponding to the wheel brakes FL and RR. Similarly, the second system is provided with two control valve units V respectively corresponding to the wheel brakes RL and FR. In addition, each of the first and second systems is provided with a reservoir 3, a pump 4, an orifice 5a, a regulator valve unit (regulator) R and a suction valve 7. Furthermore, a common motor 9 for driving the pump 4 of the first system and the pump 4 of the second system is commonly provided. This motor 9 is a motor, and the rotation speed thereof can be controlled. In this embodiment, the rotation speed of the motor is controlled by duty control.

In the following description, the fluid passage from the output port M1 of the master cylinder MC to the regulator valve unit R and the fluid passage from the output port M2 thereof to the regulator valve unit R are each referred to as an "output hydraulic passage A1." The fluid passage from the regulator valve unit R of the first system to the wheel brakes FL and RR and the fluid passage from the regulator valve unit R of the second system to the wheel brakes RL and FR are each referred to as a "wheel hydraulic passage B." The fluid passage from the output hydraulic passage A1 to the pump 4 is referred to as a "suction hydraulic passage C." The fluid passage from the pump 4 to the wheel hydraulic passage B is referred to as a "discharge hydraulic passage D." And, the fluid passage from the wheel hydraulic passage B to the suction hydraulic passage C is referred to as an "open passage a"

The control valve unit V controls the flow of the fluid under pressure between the master cylinder MC or the pump 4 and each of the wheel brakes FL, RR, RL and FR (more specifically, the wheel cylinders H), and can increase, retain or reduce the pressure of the wheel cylinder H. The control valve unit V includes an inlet valve 1, an outlet valve 2 and a check valve 1a.

The inlet valve 1 is a normally-open proportional solenoid valve provided between the master cylinder MC and each of the wheel brakes FL, RR, RL and FR, that is, in the wheel hydraulic passage B. Hence, the pressure difference between the upstream and downstream sides of the inlet valve 1 can be adjusted depending on the value of the drive current flowing in the inlet valve 1.

The outlet valve 2 is a normally-closed solenoid valve provided between each reservoir 3 and each of the wheel brakes FL, RR, RL and FR, that is, between the wheel hydraulic passage B and the open passage E. Although the outlet valve 2 is normally closed, it is opened by the control unit 20 when the wheel W is likely to lock, whereby the brake hydraulic pressure applied to each of the wheel brakes FL, FR, RL and RR is relieved to each reservoir 3.

The check valve 1a is connected in parallel with each inlet valve 1, and allows the brake fluid to flow only from each of the wheel brakes FL, FR, RL and RR to the master cylinder MC. In the case that the input from the brake pedal BP is released and when the inlet valve 1 is closed, the check valve 1a also allows the brake fluid to flow from each of the wheel brakes FL, FR, RL and RR to the master cylinder MC.

The reservoir 3 is provided in the open passage E and reserves the brake hydraulic pressure that is relieved when each outlet valve 2 is opened. A check valve 3a is provided between the reservoir 3 and the pump 4 to allow the brake fluid to flow only from the reservoir 3 to the pump 4.

The pump 4 is provided between the suction hydraulic passage C communicating with the output hydraulic passage A1 and the discharge hydraulic passage D communicating with the wheel hydraulic passage B. The pump 4 sucks the brake fluid reserved in the reservoir 3, and discharges the brake fluid to the discharge hydraulic passage D.

As a result, the brake fluid sucked by the reservoir 3 can be returned to the master cylinder MC. Furthermore, brake hydraulic pressure can be generated to apply a braking force to the wheel brakes FL, RR, RL and FR regardless of whether the brake pedal BP is operated. The discharge amount of the brake fluid from the pump 4 depends on the rotation speed (duty ratio) of the motor 9. In other words, when the rotation speed (duty ratio) of the motor 9 becomes high, the discharge amount of the brake fluid from the pump 4 increases.

The orifice 5a attenuates the pulsation of the pressure of the brake fluid discharged from the pump 4.

The regulator valve units R normally allow the brake fluid to flow from the master cylinder MC to the wheel brakes FR, FL, RR and RL, Hence, when the pressure on the side of the wheel cylinder H is raised by the brake hydraulic pressure generated by the pump 4, the pressure on the side of the wheel cylinder H is adjusted to a preset value or less by the regulator valve unit R. The regulator valve unit R includes a change-over valve 6 and a check valve 6a.

The change-over valve 6 is a normally-open proportional solenoid valve provided between the output hydraulic passage A1 communicating with the master cylinder MC and the wheel hydraulic passage B communicating with each of the wheel brakes FL, FR, RL and RR. Hence, the force for closing the change-over valve 6 is changed arbitrarily depending on the value (indicated current value) of a drive current input to the change-over valve 6, whereby the pressure difference between the upstream and downstream sides of the change-over valve 6 is adjusted and the pressure of the wheel hydraulic passage B can be adjusted to the set value or less.

The check valve 6a is connected in parallel with each change-over valve 6. The check valve 6a is a one-way valve for allowing the brake fluid to flow from the output hydraulic passage A1 to the wheel hydraulic passage B.

The suction valve 7 is a normally-closed solenoid valve provided in the suction hydraulic passage C, and is used to switch the suction hydraulic passage C to an open state or a closed state. The suction valve 7 is opened by the control of the control unit 20 when the hydraulic pressure inside the wheel brakes FL, RR, RL and FR is raised by the pump 4, for example.

Next, the control unit 20 will be described.

Figure 3:
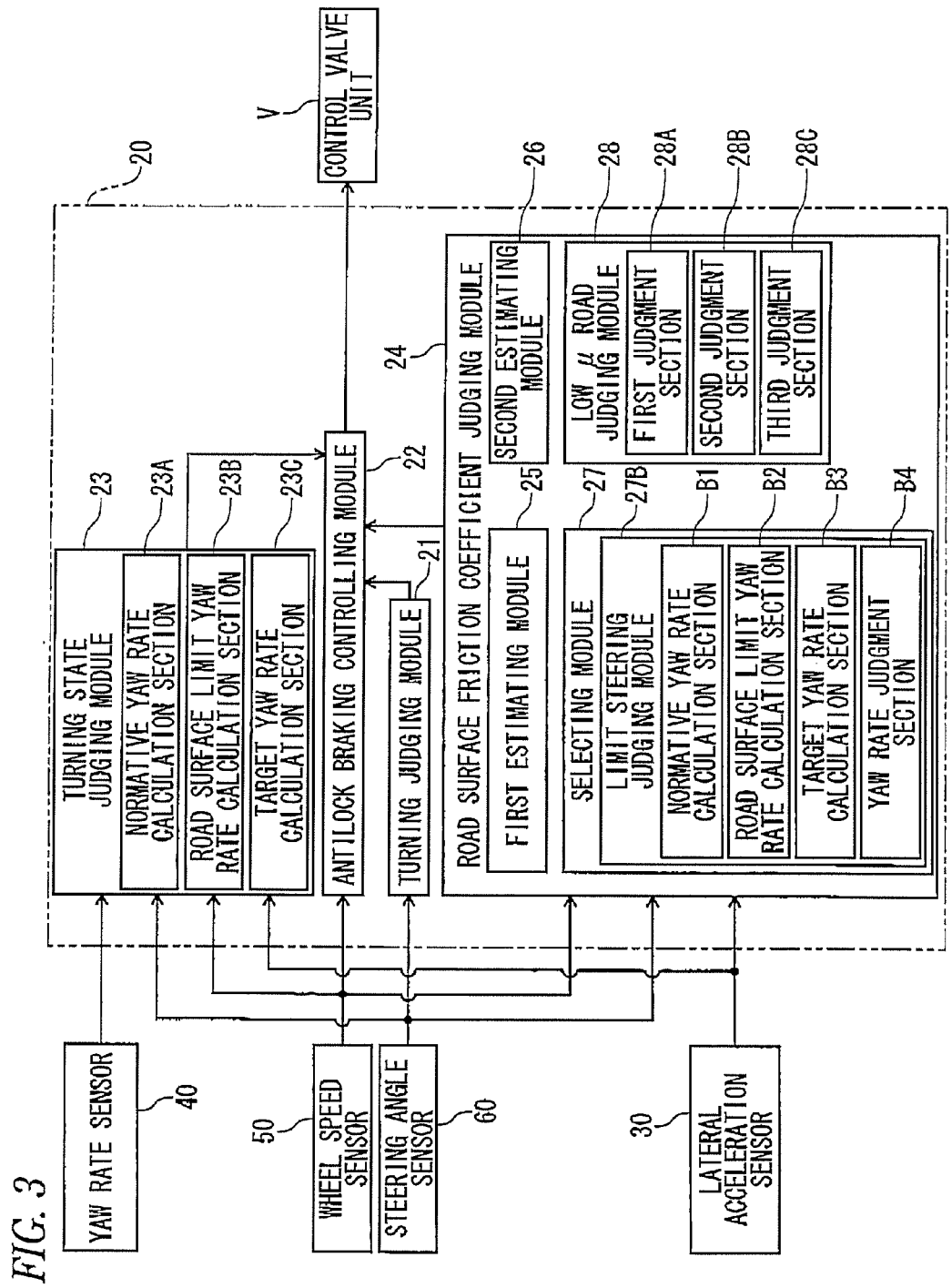
FIG. 3 illustrates a control unit in the controller.

As shown in FIG. 3, the control unit 20 controls the control valve unit V (the inlet valve 1 and the outlet valve 2) and other devices based on the signals input from the lateral acceleration sensor 30, the yaw rate sensor 40, the wheel speed sensors 50 and the steering angle sensor 60, to thereby perform antilock braking control, for example. The control unit 20 includes a turning judging module 21, an antilock braking controlling module 22, a turning state judging module 23 and a road surface friction coefficient judging module 24.

The turning judging module 21 judges whether the vehicle CR is turning based on the steering angle detected by the steering angle sensor 60. Upon judging that the vehicle is turning, the turning judging module 21 outputs a turning signal indicating that the vehicle is turning to the antilock braking controlling module 22.

The antilock braking controlling module 22 calculates the vehicle speed based on the wheel speeds detected by the four wheel speed sensors 50 and also calculates the slip amount (slip-related amount) of each wheel by subtracting each wheel speed from the vehicle speed. Furthermore, the antilock braking controlling module 22 performs antilock braking control in which the brake hydraulic pressure applied to the wheel brakes FR, FL, RR and RL is reduced under the condition that the slip amount has reached a pressure reduction threshold value (more specifically, the slip amount has become larger than the pressure reduction threshold value).

Figure 4:
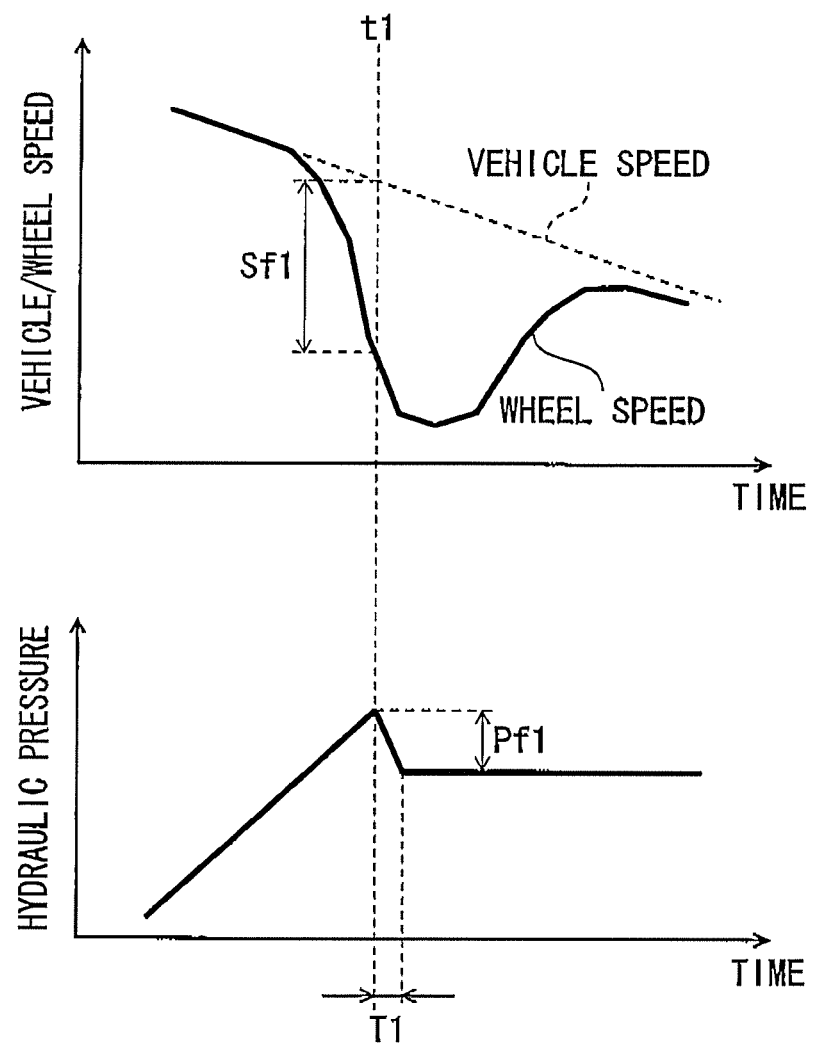
FIG. 4 illustrates the vehicle speed, the wheel speed and the hydraulic state at the time of straight running.
Figure 5:
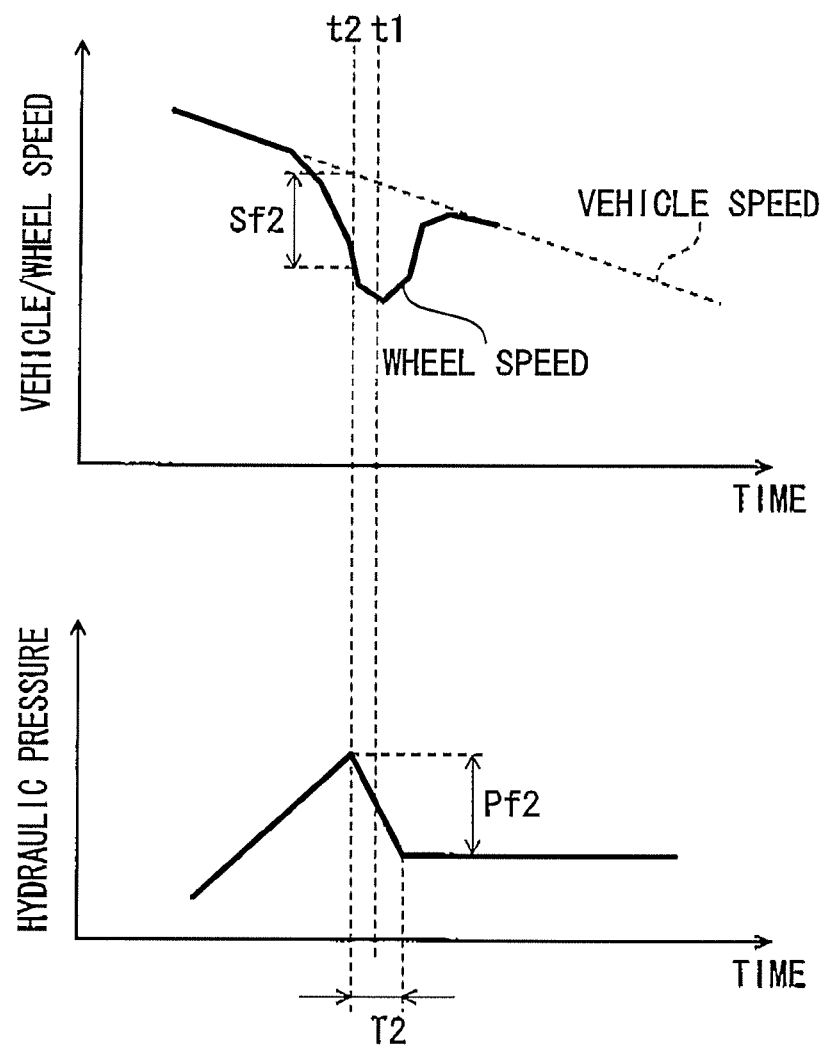
FIG. 5 illustrates the vehicle speed, the wheel speed and the hydraulic state at the time of turning.

In addition, when performing the antilock braking control and in the case of receiving a turning signal from the turning judging module 21 (in the case that the turning judging module 21 judges that the vehicle is turning), the antilock braking controlling module 22 performs turning pressure reduction control so as to change the pressure reduction threshold values to be more easily reached by the slip amount than at the time of straight running and so as to change the pressure reduction amounts of the brake fluid pressure to be larger than the pressure reduction amounts at the time of straight running. More specifically, as shown in FIGS. 4 and 5, the antilock braking controlling module 22 makes the pressure reduction threshold values at the time of turning (for example, a pressure reduction threshold value Sf2 on the front-wheel side) smaller than the pressure reduction threshold values at the time of straight running (for example, a pressure reduction threshold value Sf1 on the front-wheel side).

Furthermore, the antilock braking controlling module 22 makes the pressure reduction amounts at the time of turning (for example, a pressure reduction amount Pf2 on the front-wheel side) larger than the pressure reduction amounts at the time of straight running (for example, a pressure reduction amount Pf1 on the front-wheel side). In other words, the antilock braking controlling module 22 sets the opening time of the outlet valve 2 at the time of turning to time T2 longer than the opening time T1 at the time of straight running.

As a result, the pressure reduction timing (t2) at the time of turning can be advanced from the pressure reduction timing (t1) at the time of straight running by making the pressure reduction threshold values smaller than those at the time of straight running, and the wheel speed can be made close to the vehicle speed quickly by making the pressure reduction amounts larger than those at the time of straight running. In addition, large turning forces can be generated by making the wheel speed close to the vehicle speed quickly as described above, whereby traceability along a running line can be improved.

Moreover, the antilock braking controlling module 22 is configured to perform the above-mentioned turning pressure reduction control (control for setting the pressure reduction threshold values and the pressure reduction amounts so as to be different from those at the time of straight running) only when receiving a low friction coefficient signal from the road surface friction coefficient judging module 24 detailed later (only in the case that the road surface is judged to be a low friction coefficient road surface). When the vehicle CR is turning on a low friction coefficient road surface (hereafter also referred to as a "low μ road surface"), the traceability along a running line is apt to be worsened particularly. Hence, the turning pressure reduction control is performed to particularly deal with this situation, whereby large turning forces are generated on the low μ road surface and the traceability along the running line can be improved.

Besides, the antilock braking controlling module 22 is configured to perform control so as to change the wheels W to be subjected to the above-mentioned turning pressure reduction control depending on the turning state of the vehicle CR that is judged by the turning state judging module 23 detailed later. More specifically, in the case that the turning state is judged to be an under-steering state (hereafter also referred to as a "US state") by the turning state judging module 23, the antilock braking controlling module 22 performs turning pressure reduction control only for the front wheels.

Figure 6:
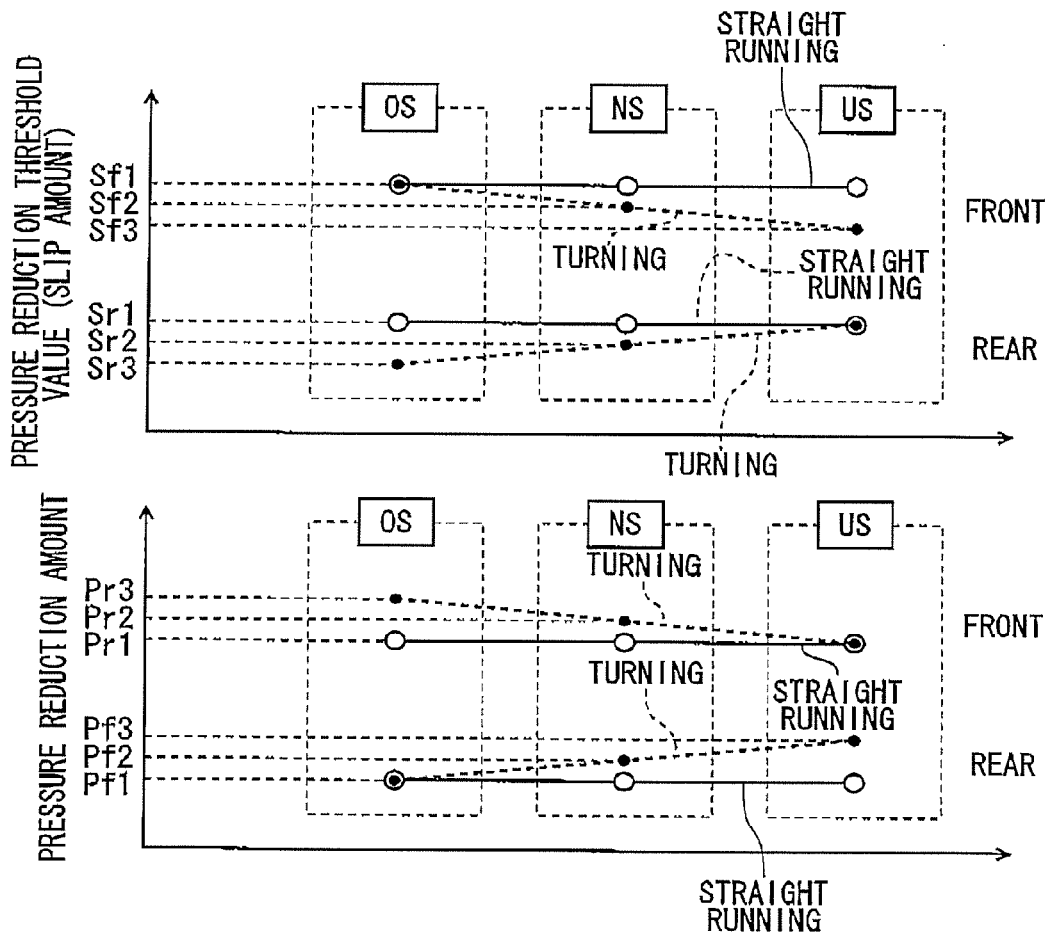
FIG. 6 illustrates pressure reduction threshold values and pressure reduction amounts depending on the turning state of the vehicle.

In other words, as shown in FIG. 6, in the US state, the pressure reduction threshold value of the front wheels is set to a value Sf3 (a black circle) smaller than the value Sf1 (a white circle) at the time of straight running, and the pressure reduction amount of the front wheels is set to a value Pf3 larger than the value Pf1 at the time of straight running. On the other hand, both the pressure reduction, threshold value and the pressure reduction amount of the rear wheels are set to be equal to the values Sr1 and Pr1 at the time of straight running, respectively.

In the case that the turning state is judged to be a neutral-steering state (hereafter also referred to as an "NS state") by the turning state judging module 23, the antilock braking controlling module 22 performs turning pressure reduction control for the front wheels and the rear wheels. In other words, in the NS state, the pressure reduction threshold values of the front and rear wheels are set to values Sf2 and Sr2 smaller than the values Sf1 and Sr1 at the time of straight running, and the pressure reduction amounts of the front and rear wheels are set to values Pf2 and Pr2 larger than the values Pf1 and Pr1 at the time of straight running.

In the case that the turning state is judged to be an over-steering state (hereafter also referred to as an "OS state") by the turning state judging module 23, the antilock braking controlling module 22 performs turning pressure reduction control only for the rear wheels. In other words, in the OS state, the pressure reduction threshold value of the rear wheels is set to a value Sr3 smaller than the value Sr1 at the time of straight running, and the pressure reduction amount of the rear wheels is set to a value Pr3 larger than the value Pr1 at the time of straight running. On the other hand, both the pressure reduction threshold value and the pressure reduction amount of the front wheels are set to be equal to the values Sf1 and Pf1 at the time of straight running.

Hence, the wheels W to be subjected to the turning pressure reduction control are switched depending on the turning state of the vehicle CR, whereby large turning forces are generated while the stability of the vehicle CR is improved and the traceability along a running line can be improved.

Figure 7A:
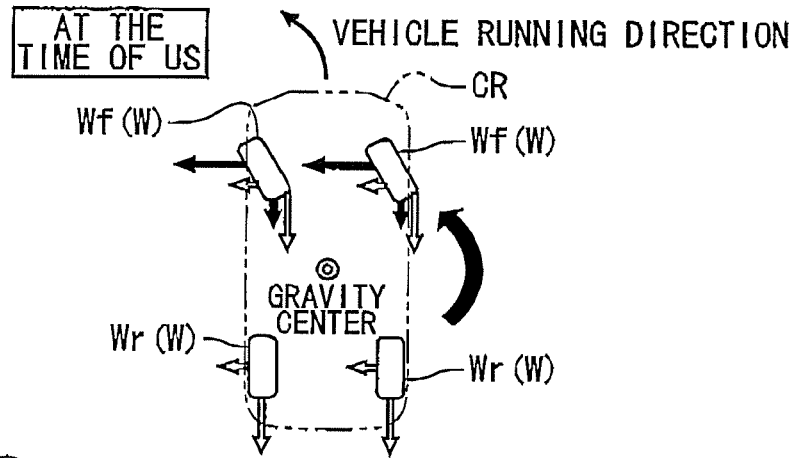
FIGS. 7A to 7C illustrate forces applied to the respective wheels and changing depending on the turning state of the vehicle.
Figure 7B:
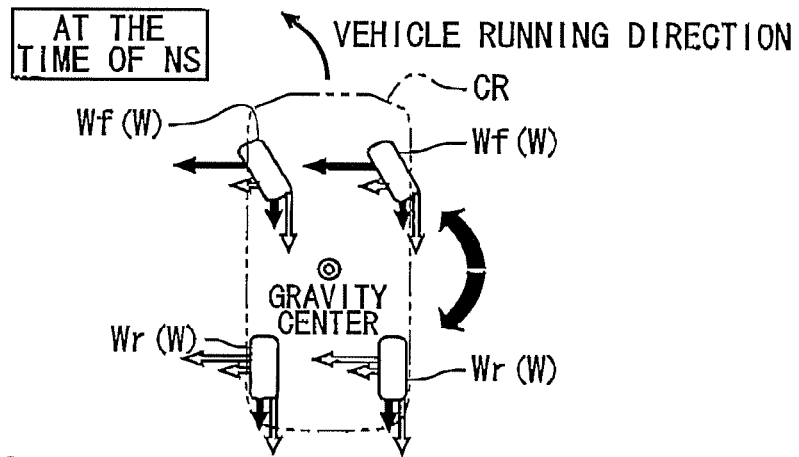
Figure 7C:
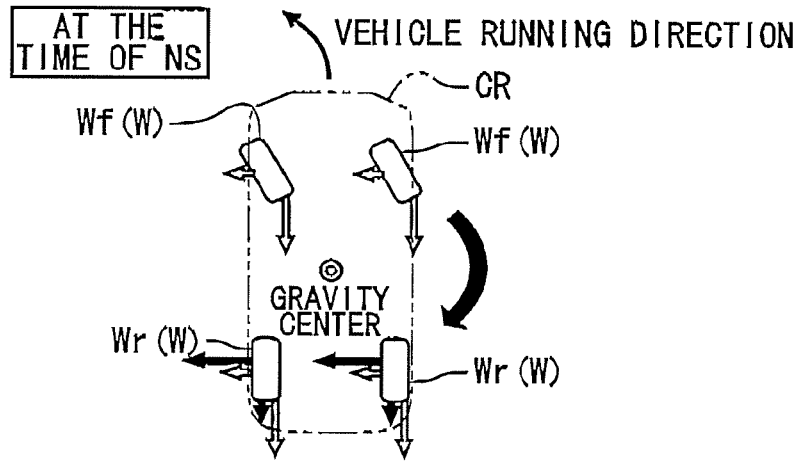

In the turning pressure reduction control that is performed only for the front wheels in the US state, the pressure reduction threshold value is set to the value Sf3 smaller than the pressure reduction threshold value Sf2 of the front wheels in the NS state, and the pressure reduction amount is set to the value Pf3 larger than the pressure reduction amount Pf2 of the front wheels in the NS state. Since the pressure reduction threshold value and the pressure reduction amount of the front wheels in the US state are changed significantly so as to be larger than those in the NS state as described above, larger turning forces (side forces indicated by black arrows) are generated at the front wheels Wf as shown in FIG. 7A, whereby the traceability along a running line can be improved while the US state is eliminated. In FIGS. 7A to 7C, the black arrows indicate the side forces (indicated by the arrows in the lateral direction) and the braking forces (indicated by the arrows in the downward direction) applied to the wheels W by the turning pressure reduction control, and the white arrows indicate side forces and the braking forces applied to the wheels W by ordinary pressure reduction control different from the turning pressure reduction control.

As shown in FIG. 6, also in the turning pressure reduction control that is performed only for the rear wheels in the OS state, the pressure reduction threshold value is set to the value Sr3 smaller than the pressure reduction threshold value Sr2 of the rear wheels in the NS state, and the pressure reduction amount is set to the value Pr3 larger than the pressure reduction amount Pr2 of the rear wheels in the NS state. Since the pressure reduction threshold value and the pressure reduction amount of the rear wheels are changed significantly as described above, larger side forces are generated at the rear wheels Wr as shown in FIG. 7C, whereby the side skidding of the rear wheels Wr is reduced and the traceability along a running line can be improved while the OS state is eliminated.

As shown in FIG. 6, the difference between the pressure reduction threshold value in the NS state and the pressure reduction threshold value at the time of straight running for the front wheels is nearly equal to the difference therebetween for the rear wheels. Similarly, the difference between the pressure reduction amount in the NS state and the pressure reduction amount at the time of straight running for the front wheels is nearly equal to the difference therebetween for the rear wheels. Hence, as shown in FIG. 7B, nearly equal turning forces are applied to the respective wheels W. As a result, the side skidding of the vehicle CR can be suppressed and the traceability along a running line can be improved.

Figure 8:
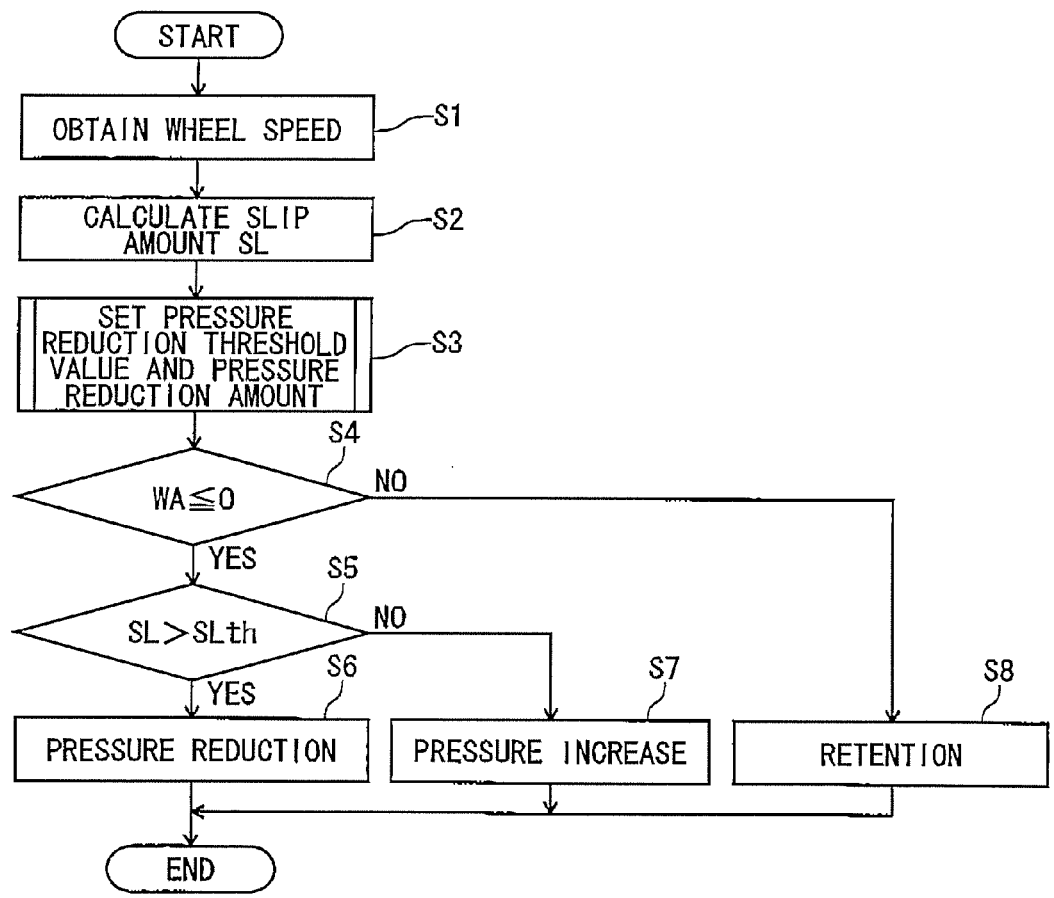
FIG. 8 illustrates an antilock braking control.
Figure 9:
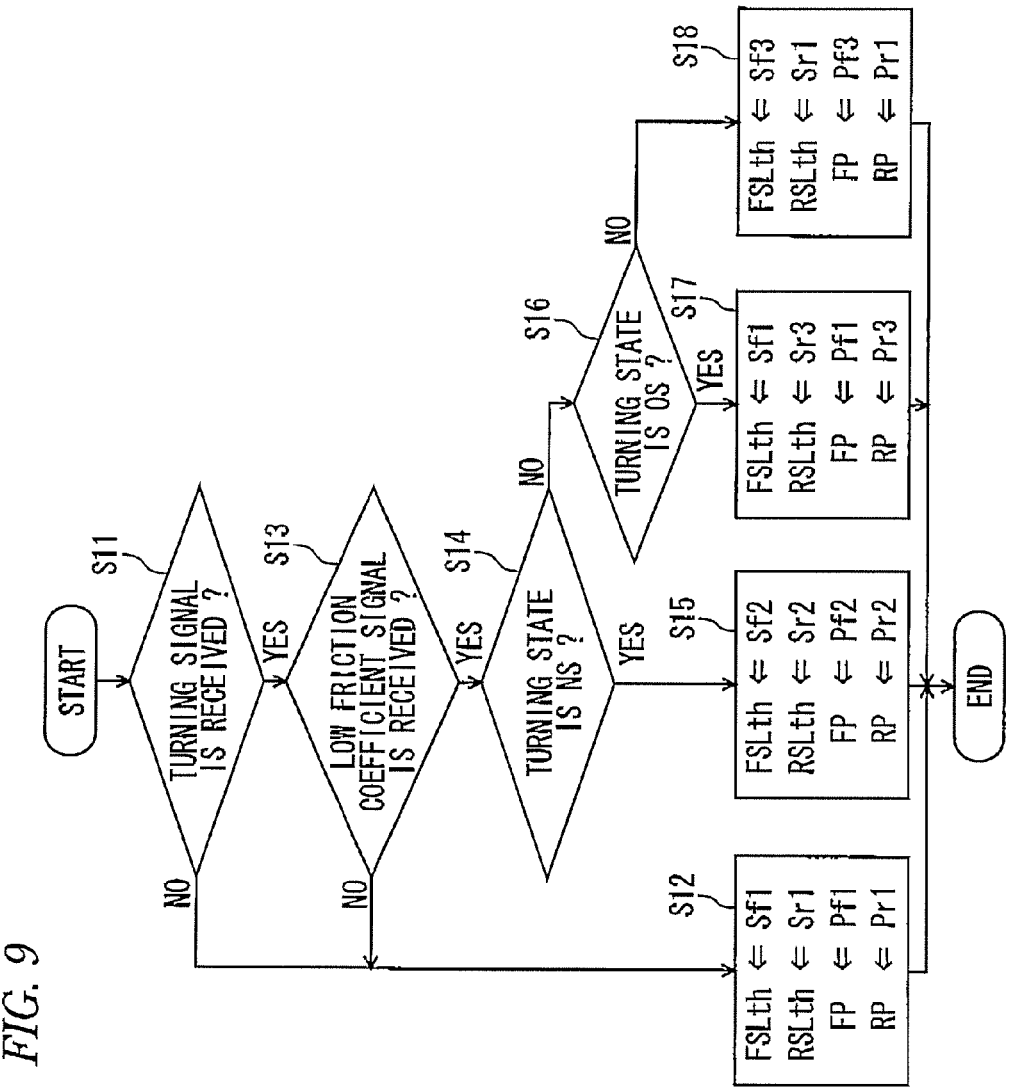
FIG. 9 illustrates a control for setting the pressure reduction threshold values and the pressure reduction amounts.

More specifically, the antilock braking controlling module 22 performs antilock braking control as shown in FIGS. 8 and 9. As shown in FIG. 8, the antilock braking controlling module 22 first obtains the wheel speed of each wheel W from each wheel speed sensor 50 (at S1) and calculates the slip amount SL of each wheel W based on each wheel speed (at S2).

After step S2, the antilock braking controlling module 22 sets a pressure reduction threshold value and a pressure reduction amount based on signals output from the turning state judging module 23 and the road surface friction coefficient judging module 24 (at S3). A specific process at step S3 will be detailed later using FIG. 9.

After the pressure reduction threshold value and the pressure reduction amount are set at step S3, the antilock braking controlling module 22 judges whether the wheel acceleration WA calculated based on the wheel speed is equal to or less than 0 (at S4). In the case that the wheel acceleration WA is equal to or less than 0 at step S4 (Yes), the antilock braking controlling module 22 judges whether the slip amount SL is more than the pressure reduction threshold value SLth having been set at step S3 (at S5).

In the case that the slip amount SL is more than the pressure reduction threshold value SLth at step S5 (Yes), the antilock braking controlling module 22 performs pressure reduction control based on the pressure reduction amount having been set at step S3 (at S6). In the case that the slip amount SL is not more than the pressure reduction threshold value SLth at step S5 (No), the antilock braking controlling module 22 performs pressure increase control (at S7).

In the case that the wheel acceleration WA is more than 0 at step S4 (No), the antilock braking controlling module 22 performs retention control (at S8). After step S6, step S7 or step S8, the antilock braking controlling module 22 returns to step S1 again and performs the control repeatedly.

As shown in FIG. 9, in the process at step S3 for setting the pressure reduction threshold value and the pressure reduction amount, the antilock braking controlling module 22 first judges whether a turning signal indicating that the turning judging module 21 has judged that the vehicle CR is turning is received (at S11). Upon judging that the turning signal is not received at step S11 (No), the antilock braking controlling module 22 sets a front side pressure reduction threshold value FSLth, a rear side pressure reduction threshold value RSLth, a front side pressure reduction amount FP and a rear side pressure reduction amount RP to the front wheel pressure reduction threshold value Sf1, the rear wheel pressure reduction threshold value Sr1, the front wheel pressure reduction amount Pf1 and the rear wheel pressure reduction amount Pr1 at the time of straight running, respectively, based on the map shown in FIG. 6.

Upon judging that the turning signal is received at step S11 (Yes), the antilock braking controlling module 22 judges whether a low friction coefficient signal is received from the road surface friction coefficient judging module 24 described later (at S13). Upon judging that the low friction coefficient signal is not received at step S13 (No), the antilock braking controlling module 22 sets the values, such as the front side pressure reduction threshold value FSLth, to the same values, such as the value Sf1, as those at the time of straight running (at S12).

Upon judging that the low friction coefficient signal is received at step S13 (Yes), the antilock braking controlling module 22 judges whether the turning state of the vehicle CR judged by the turning state judging module 23 described later is the NS state (at S14). Upon judging that the turning state judged by the turning state judging module 23 is the NS state at step S14 (Yes), the antilock braking controlling module 22 sets the front side pressure reduction threshold value FSLth, the rear side pressure reduction threshold value RSLth, the front side pressure reduction amount FP and the rear side pressure reduction amount RP to the front wheel pressure reduction threshold value Sf2, the rear wheel pressure reduction threshold value Sr2, the front wheel pressure reduction amount Pf2 and the rear wheel pressure reduction amount Pr2 at the time of the NS state, respectively, based on the map shown in FIG. 6 (at S15).

Upon judging that the turning state judged by the turning state judging module 23 is not the NS state at step S14 (No), the antilock braking controlling module 22 judges whether the turning state judged by the turning state judging module 23 is the OS state (at S16). Upon judging that the turning state judged by the turning state judging module 23 is the OS state at step S16 (Yes), the antilock braking controlling module 22 sets the front side pressure reduction threshold value FSLth, the rear side pressure reduction threshold value RSLth, the front side pressure reduction amount FP and the rear side pressure reduction amount RP to the front wheel pressure reduction threshold value Sf1, the rear wheel pressure reduction threshold value Sr3, the front wheel pressure reduction amount Pf1 and the rear wheel pressure reduction amount Pr3 at the time of the OS state, respectively, based on the map shown in FIG. 6 (at S17).

Still further, upon judging that the turning state judged by the turning state judging module 23 is not the OS state at step S16 (No), the antilock braking controlling module 22 sets the front side pressure reduction threshold value FSLth, the rear side pressure reduction threshold value RSLth, the front side pressure reduction amount FP and the rear side pressure reduction amount RP to the front wheel pressure reduction threshold value Sf3, the rear wheel pressure reduction threshold value Sr1, the front wheel pressure reduction amount Pf3 and the rear wheel pressure reduction amount Pr1 at the time of the US state, respectively, based on the map shown in FIG. 6 (at S18).

As shown in FIG. 3, the turning state judging module 23 judges whether the vehicle CR is in the under-steering state, the neutral-steering state or the over-steering state. More specifically, the turning state judging module 23 includes a normative yaw rate calculation section 23A, a road surface limit yaw rate calculation section 23B and a target yaw rate calculation section 23C. The following description is given referring to FIG. 3 and FIG. 10.

The normative yaw rate calculation section 23A calculates a normative yaw rate Y1 using the steering angle obtained from the steering angle sensor 60 and the vehicle speed calculated from the wheel speeds obtained from the wheel speed sensors 50. More specifically, the normative yaw rate calculation section 23A calculates the normative yaw rate Y1 by multiplying the coefficient calculated from a first map MP1 to the vehicle speed calculated based on the signals from the wheel speed sensors 50 and by performing arithmetic operation (for example, by performing multiplication) on the obtained value and the steering angle obtained from the steering angle sensor 60. The first map MP1 is herein a map indicating the relationship between the vehicle speed and the coefficient and is set appropriately by experiments, simulations, etc.

The road surface limit yaw rate calculation section 23B calculates a road surface limit yaw rate Y2 determined by the actual lateral acceleration obtained from the lateral acceleration sensor 30 and the vehicle speed calculated from the wheel speeds obtained from the wheel speed sensors 50.

More specifically, the road surface limit yaw rate calculation section 23B calculates the road surface limit yaw rate Y2 by performing arithmetic operation. For (example, this calculation is performed by division on the value calculated based on a second map MP2 from the lateral acceleration filter value obtained by subjecting the absolute value of the actual lateral acceleration obtained from the lateral acceleration sensor 30 to a filtering process in which the absolute value is made difficult to be changed to the decreasing side and the vehicle speed.

For example, when "the absolute value of the lateral acceleration" is smaller than the previous value by a given amount, the filtering process is performed by setting "the absolute value of the lateral acceleration" at this time to a value smaller than the previous value by the given amount. The second map MP2 indicates the relationship between the lateral acceleration filter value and the road surface limit yaw rate, and is set appropriately by experiments, simulations, etc.

The target yaw rate calculation section 23C calculates a target yaw rate Y3 from the normative yaw rate Y1 calculated by the nonnative yaw rate calculation section 23A and the road surface limit yaw rate Y2 calculated by the road surface limit yaw rate calculation section 23B. More specifically, the target yaw rate calculation section 23C subjects the normative yaw rate Y1 to a limiting process using the road surface limit yaw rate Y2, that is, sets the normative yaw rate Y1 or the road surface limit yaw rate Y2, whichever smaller, as the target yaw rate Y3.

Figure 10:
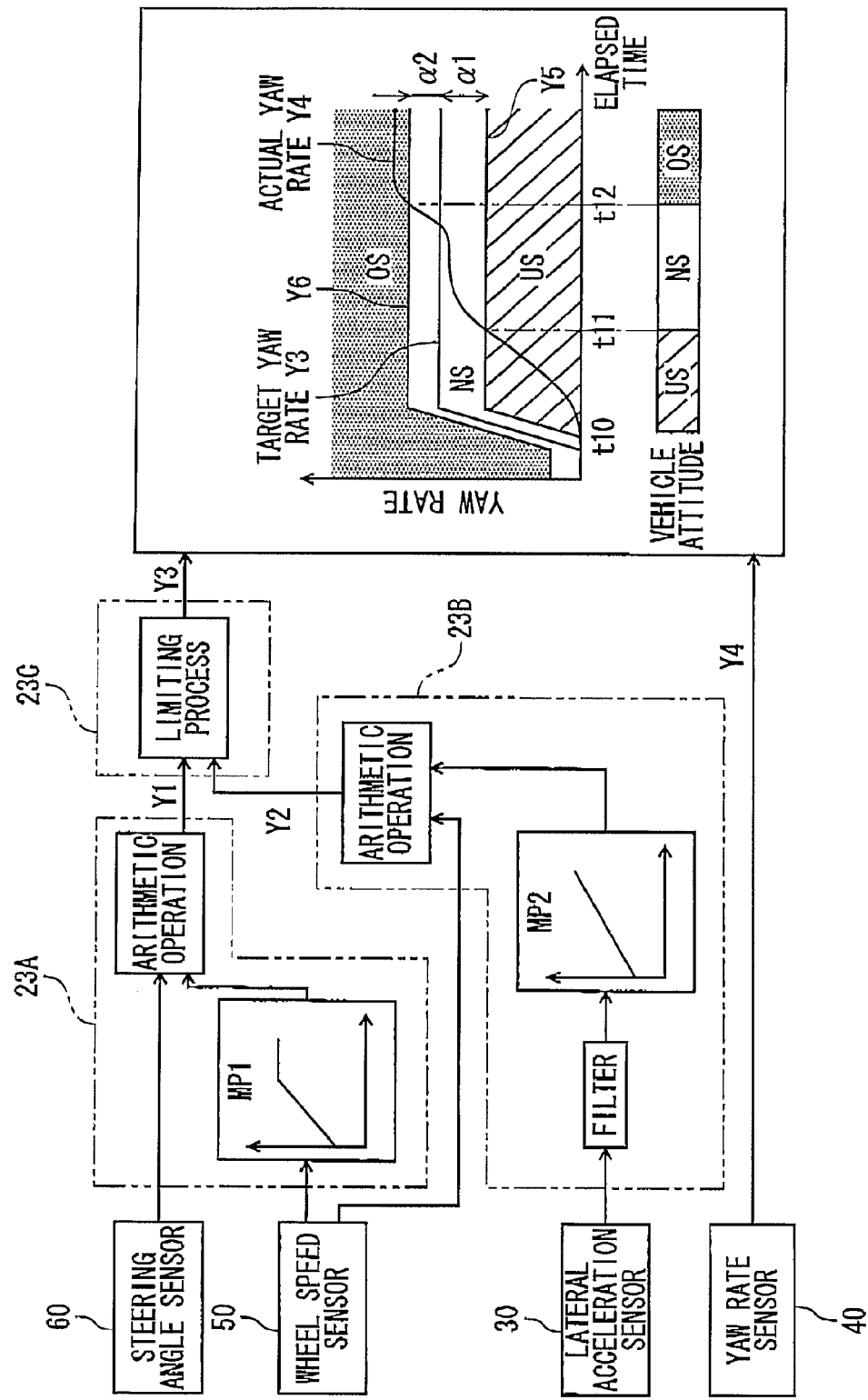
FIG. 10 illustrates a method for judging the turning state of the vehicle.

In addition, as shown in the right side graph of FIG. 10, the turning state judging module 23 compares the target yaw rate Y3 calculated by the target yaw rate calculation section 23C with the actual yaw rate Y4 obtained from the yaw rate sensor 40 and actually applied to the vehicle CR. In the case that the actual yaw rate Y4 is smaller than the value Y5 obtained by subtracting a given value (first given value) α1 from the target yaw rate Y3, the turning state judging module 23 judges that the vehicle CR is in the US state (between time 10 and time t11).

In the case that the actual yaw rate Y4 is larger than the value Y6 obtained by adding a given value (second given value) α2 to the target yaw rate Y3, the turning state judging module 23 judges that the vehicle CR is in the OS state (at time t12 and thereafter). In the case that the actual yaw rate Y4 is in the range from the value Y5 to the value Y6 (that is, in the case that the vehicle CR is not judged to be in the US state or the OS state), the turning state judging module 23 judges that the vehicle CR is in the NS state (between time t11 and time t12).

Hence, the turning state of the vehicle CR can be distinguished easily based on the deviation between the target yaw rate Y3 and the actual yaw rate Y4, and more appropriate control can be performed depending on the type of vehicle by changing the given value α1 and the given value α2 depending on the type of vehicle.

As shown in FIG. 3, the road surface friction coefficient judging module 24 judges whether the road surface is at least a low μ road surface. Upon judging that the road surface is a low μ road surface, the road surface friction coefficient judging module 24 outputs a low friction coefficient signal indicating the result of the judgment to the antilock braking controlling module 22. More specifically, the road surface friction coefficient judging module 24 includes a first estimating module 25, a second estimating module 26, a selecting module 27 and a low μ road judging module 28. The first estimating module 25, the second estimating module 26 and the selecting module 27 correspond to an example of a road surface friction coefficient estimating device. The following description is given referring to FIG. 3 and FIG. 11.

The first estimating module 25 estimates a first road surface friction coefficient CF1 based on the actual lateral acceleration (denoted by "lateral G" in FIG. 11) obtained from the lateral acceleration sensor 30. More specifically, the first estimating module 25 calculates the first road surface friction coefficient CF1 from the lateral acceleration filter value obtained by performing a filtering process (a process similar to the above-mentioned filtering process) in which the absolute value of the actual lateral acceleration is made difficult to be changed only to the decreasing side and from the map MP3.

The map MP3 is herein a map indicating the relationship between the lateral acceleration filter value and the μ value of the road surface and is set appropriately by experiments, simulations, etc. Since the absolute value of the actual lateral acceleration is subjected to the filtering process as described above, the problem that the first road surface friction coefficient CF1 is mistakenly estimated to be small because the actual lateral acceleration fluctuates due to disturbance or the like or the steering wheel is turned quickly in one direction and then in the other direction can be prevented.

The second estimating module 26 estimates a second road surface friction coefficient CF2 based on the wheel acceleration (longitudinal acceleration) calculated from the wheel speeds. Since the technology for estimating a road surface friction coefficient based on wheel acceleration is known, its description is omitted.

The selecting module 27 selects the first road surface friction coefficient CF1 or the second road surface friction coefficient CF2 as the road surface friction coefficient CF of the road surface on which the vehicle is running. More specifically, the selecting module 27 has a limit steering judging module 27B.

The limit steering judging module 27B judges whether steering exceeding the limit of road surface conditions (steering generating lateral acceleration larger than the maximum lateral acceleration that can be generated at the friction coefficient of the road surface on which the vehicle CR is running) is performed based on the steering angle obtained from the steering angle sensor 60, the actual lateral acceleration obtained from the lateral acceleration sensor 30 and the vehicle speed calculated based on the wheel speeds obtained from the wheel speed sensors 50. More specifically, the limit steering judging module 27B includes a normative yaw rate calculation section B1, a road surface limit yaw rate calculation section B2, a target yaw rate calculation section B3 and a yaw rate judgment section B4.

The normative yaw rate calculation section B1 has a function similar to that of the above-mentioned normative yaw rate calculation section 23A, that is, it calculates the normative yaw rate Y1 (absolute value) using the steering angle obtained from the steering angle sensor 60 and the vehicle speed calculated from the wheel speeds obtained from the wheel speed sensors 50. More specifically, the normative yaw rate calculation section B1 calculates the normative yaw rate Y1 by multiplying the coefficient calculated from the first map MP1 to the vehicle speed calculated based on the signals from the wheel speed sensors 50 and by performing arithmetic operation (for example, by performing multiplication) on the obtained value and the steering angle obtained from the steering angle sensor 60. The first map MP1 is herein a map indicating the relationship between the vehicle speed and the coefficient and is set appropriately by experiments, simulations, etc.

The road surface limit yaw rate calculation section B2 has a function similar to that of the above-mentioned road surface limit yaw rate calculation section 23B, that is, it calculates the road surface limit yaw rate Y2 (absolute value) determined by the actual lateral acceleration obtained from the lateral acceleration sensor 30 and the vehicle speed calculated from the wheel speeds obtained from the wheel speed sensors 50. More specifically, the road surface limit yaw rate calculation section B2 calculates the road surface limit yaw rate Y2 by performing arithmetic operation (for example, by performing division) on the value calculated based on a second map MP2 from the lateral acceleration filter value obtained by subjecting the absolute value of the actual lateral acceleration obtained from the lateral acceleration sensor 30 to a filtering process in which the absolute value is made difficult to be changed to the decreasing side and the vehicle speed.

The target yaw rate calculation section 33 has a function similar to that of the above-mentioned target yaw rate calculation section 23C, that is, it calculates the target yaw rate Y3 from the normative yaw rate Y1 calculated by the normative yaw rate calculation section B1 and the road surface limit yaw rate Y2 calculated by the road surface limit yaw rate calculation section B2. More specifically, the target yaw rate calculation section B3 subjects the normative yaw rate Y1 to a limiting process using the road surface limit yaw rate Y2, that is, it sets the normative yaw rate Y1 (absolute value) or the road surface limit yaw rate Y2 (absolute value), whichever smaller, as the target yaw rate Y3 (absolute value).

The normative yaw rate calculation section B1, the road surface limit yaw rate calculation section 32 and the target yaw rate calculation section B3 may be the same as the normative yaw rate calculation section 23A, the road surface limit yaw rate calculation section 23B and the target yaw rate calculation section 23C described above, respectively or may be different sections in which the intensity of each filter and the setting of each map are made different.

The yaw rate judgment section B4 judges whether a value Y7 obtained by subtracting the target yaw rate Y3 from the absolute value of the normative yaw rate Y1 is larger than a positive given value (third given value) $\beta$, to thereby judge whether the normative yaw rate Y1 is substantially larger than the road surface limit yaw rate Y2 by the given value $\beta$. This is because Y7=Y1−Y3 and Y3=MIN (Y1, Y2). Hence, in the case that the value Y7 is larger than the positive given value $\beta$ (Y1>Y2+$\beta$), the limit steering judging module 27B judges that steering exceeding the limit of road surface conditions is performed; in the case that the value Y7 is equal to or less than the positive given value $\beta$ (Y1<Y2+$\beta$), the limit steering judging module 27B judges that steering exceeding the limit of road surface conditions is not performed.

As a result, it is possible to accurately judge whether steering exceeding the limit of road surface conditions is performed using the normative yaw rate Y1 genuinely corresponding to the steering (steering angle) of the driver and the target yaw rate Y3 relating to the road surface limit yaw rate Y2 determined by the current actual lateral acceleration and the vehicle speed.

Figure 11:
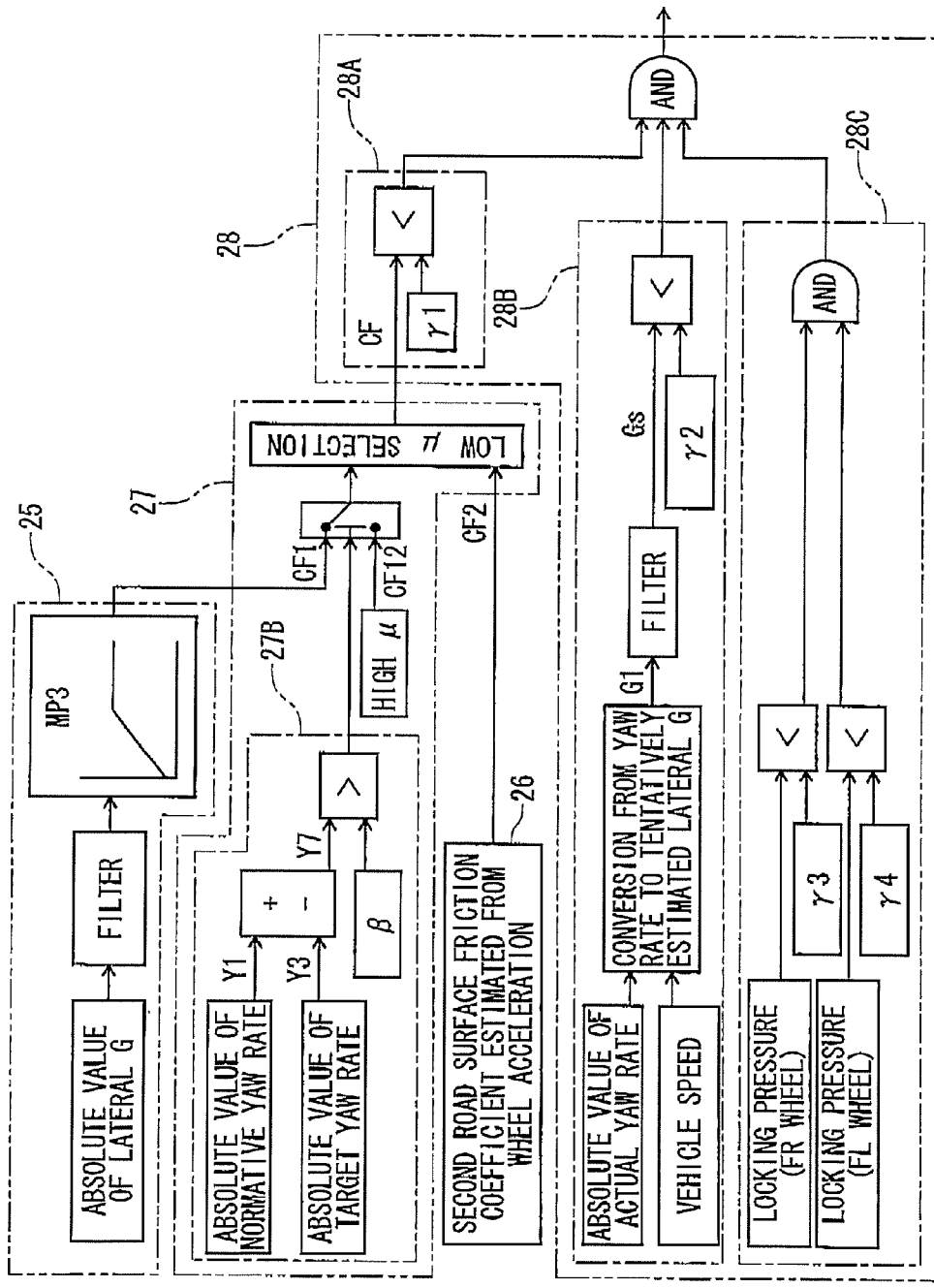
FIG. 11 illustrates a method for judging whether the road surface is a low μ road surface.

When the yaw rate judgment section B4 judges that steering exceeding the limit of road surface conditions is performed, the selecting module 27 selects the first road surface friction coefficient CF1 and selects the first road surface friction coefficient CF1 or the second road surface friction coefficient CF2, whichever smaller, as the road surface friction coefficient CF (refer to "low μ selection" shown in FIG. 11). When the yaw rate judgment section B4 judges that steering exceeding the limit of road surface conditions is not performed, the selecting module 27 selects a high friction coefficient CF12 according to which the second road surface friction coefficient CF2 is selected as the road surface friction coefficient CF, thereby selecting the second road surface friction coefficient CF2 as the road surface friction coefficient CF at the next "low selection" process.

As a result, the first road surface friction coefficient CF1 that is estimated from the actual lateral acceleration only when steering exceeding the limit of road surface conditions is performed can be selected. For this reason, the use of the actual lateral acceleration in a state in which no maximum lateral acceleration is generated can be prevented. Furthermore, the road surface friction coefficient CF is estimated accurately, whereby whether the road surface is a low μ road surface can be properly judged according to the road surface friction coefficient CF.

The low μ road judging module 28 judges whether the road surface on which the vehicle CR is running is a low μ road surface. The low μ road judging module 28 includes a first judgment section 28A, a second judgment section 28B and a third judgment section 28C.

The first judgment section 28A judges whether a first condition in which the road surface friction coefficient CF selected by the selecting module 27 is smaller than a given value (fourth given value) $\gamma 1$ is satisfied.

The second judgment section 28B judges whether a second condition in which the estimated lateral acceleration Gs calculated based on the absolute value of the actual yaw rate obtained from the yaw rate sensor 40 is smaller than a given value (fifth given value) $\gamma 2$ is satisfied. More specifically, the second judgment section 28B calculates a tentatively estimated lateral acceleration G1 from the absolute value of the actual yaw rate and the vehicle speed and calculates the estimated lateral acceleration Gs by subjecting the tentatively estimated lateral acceleration G1 to a filtering process (a process similar to the above-mentioned filtering process) in which the tentatively estimated lateral acceleration G1 is made difficult to be changed only to the decreasing side.

As a method for calculating the tentatively estimated lateral acceleration G1 from the absolute value of the actual yaw rate and the vehicle speed, a method is available in which, for example, an equation represented by "tentatively estimated lateral acceleration=vehicle speed×angular speed (a value obtained when the yaw rate is expressed in radian)" is used.

Since the estimated lateral acceleration Gs is calculated as described above, the problem that the estimated lateral acceleration Gs is mistakenly estimated to be small because the yaw rate fluctuates due to disturbance or the like or the steering wheel is turned quickly in one direction and then in the other direction can be prevented.

The third judgment section 28C judges whether a third condition in which the locking hydraulic pressures (the brake hydraulic pressures inside the wheel cylinders H at the time when pressure reduction control is started) at the left and right front wheels are smaller than given values (sixth given values) $\gamma 3$ and $\gamma 4$, respectively, when pressure reduction is performed by antilock braking control is satisfied. The given values $\gamma 3$ and $\gamma 4$ used herein may be the same value or may be different values.

Since the locking hydraulic pressures of the front wheels that are easily affected by the state of the road surface because loads are applied thereto at the time of braking are used and the locking hydraulic pressures of the left and right wheels are judged individually as described above, the judgment as to whether the road surface is a low μ road surface based on the locking hydraulic pressures can be performed securely.

In addition, the low μ road judging module 28 judges that the road surface is a low μ road surface when the first condition, the second condition and the third condition are all satisfied. Hence, the judgment as to whether the road surface is a low μ road surface is made not only by the road surface friction coefficient CF selected by the selecting module 27, but by other conditions (such as a condition in which the estimated lateral acceleration Gs estimated from the actual yaw rate is small or a condition in which the locking hydraulic pressures are low). As a result, the judgment as to whether the road surface is a low μ road surface can be made more accurately.

Since the judgment is made by using not only the road surface friction coefficient CF obtained by the lateral acceleration sensor 30 and other devices, but also other conditions as described above, even in the case that the road surface friction coefficient CF is estimated to have a mistaken value because the lateral acceleration sensor 30, for example, is defective, the fact that the estimated value is a mistaken value can be judged by other conditions (such as a condition of the estimated lateral acceleration Gs or a condition of the locking hydraulic pressures).

The present invention is not limited to the above-mentioned embodiment, but can be embodied in various embodiments.

Figure 12:
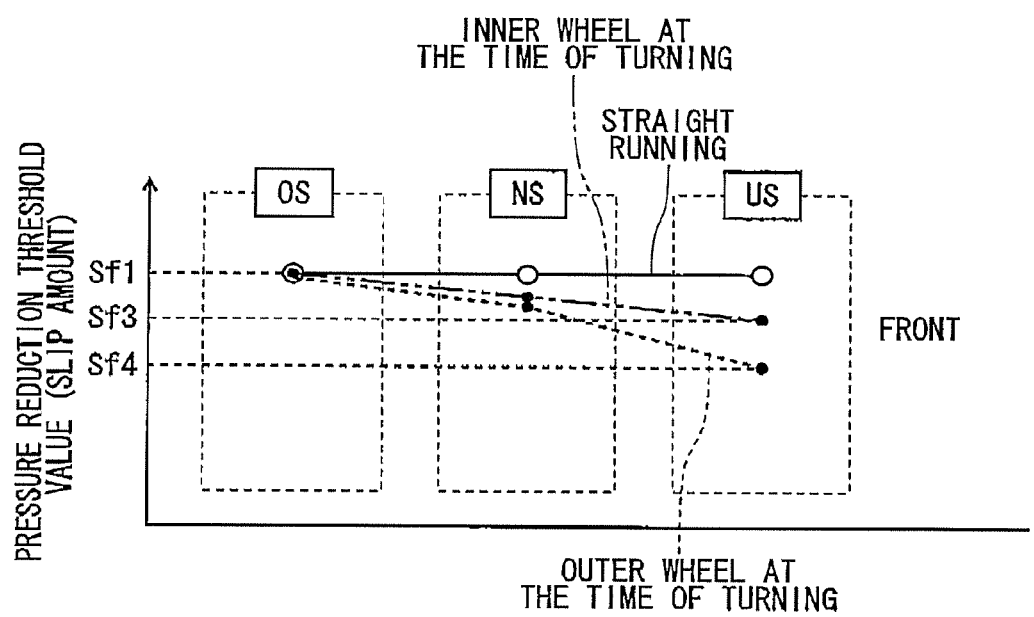
FIG. 12 illustrates the pressure reduction threshold values of the front outer wheel and the front inner wheel at the time of turning differentiated from each other.

In the above-mentioned embodiment, it is assumed that the respective pressure reduction threshold values of the left and right front wheels in the US state are the same value Sf3. However, in the present invention, without being limited to this, in the case of turning pressure reduction control to be performed only for the front wheels in the US state, the pressure reduction threshold value of the outer wheel at the time of turning may be set to a value Sf4 (a value to be more easily reached) smaller than the pressure reduction threshold value Sf3 of the inner wheel at the time of turning as shown in FIG. 12. Since the pressure reduction threshold value of the outer wheel to which the weight of the vehicle is applied more heavily is made smaller than the pressure reduction threshold value of the inner wheel as described above, the turning force of the outer wheel can be used effectively and the US state can be eliminated more easily.

Similarly, in the OS state, the pressure reduction threshold value of the outer rear wheel may be adjusted to be more easily reached, that is, may be set to a value smaller than the pressure reduction threshold value of the inner rear wheel. Also in this case, the turning force of the outer wheel to which the vehicle weight is applied more heavily can be used effectively and the OS state can be eliminated more easily.

In the above-mentioned embodiment, although it is assumed that the slip-related amount is a slip amount, the present invention is not limited to this, but a slip ratio may be used for example.

In the above-mentioned embodiment, although the given value β is set to a positive value for safety, the present invention is not limited to this, but the given value β is set to zero, and the yaw rate judgment section may be configured simply so as to judge whether the normative yaw rate is larger than the road surface limit yaw rate.

In the above-mentioned embodiment, although both the second judgment section 28B and the third judgment section 28C are provided, the present invention is not limited to this, but either one of the second judgment section 28B and the third judgment section 28C may be provided. In this case, the judgment section should only judge that the road surface is a low μ road surface when two conditions, that is, the first condition and the second condition (or the third condition), are satisfied.

In the above-mentioned embodiment, although the second road surface friction coefficient CF2 is selected as the road surface friction coefficient CF by using the high friction coefficient CF12 when it is judged that steering exceeding the limit of road surface conditions is not performed, the present invention is not limited to this. For example, the selecting module may be configured so as to select the second road surface friction coefficient while ignoring the first road surface friction coefficient when it is judged that steering exceeding the limit of road surface conditions is not performed.

In the above-mentioned embodiment, although the road surface friction coefficient estimating device is configured as part of the control unit 20 of the vehicle brake hydraulic controller 100, the present invention is not limited to this, but the road surface friction coefficient estimating device may be configured simply as a device only for estimating a road surface friction coefficient.

The invention claimed is:

1. A vehicle brake hydraulic controller including:
   an antilock braking controlling module configured to perform an antilock braking control in which a brake hydraulic pressure applied to wheel brakes is reduced under the condition that a slip-related amount has reached a pressure reduction threshold value, the slip-related amount being calculated using a vehicle speed and a wheel speed; and
   a turning judging module configured to judge whether a vehicle is turning based on a steering angle,
   wherein, when the antilock braking control is performed and in the case that the turning judging module judges that the vehicle is turning, the antilock braking controlling module performs a turning pressure reduction control so as to:
     change the pressure reduction threshold values at the time of turning smaller than the pressure reduction threshold values at the time of straight running,
     wherein the pressure reduction threshold value at the time of straight running is a first threshold value, the pressure reduction threshold value at the time of turning is a second threshold value, and the first threshold value is larger than the second threshold value, and further comprising:
   a road surface friction coefficient judging module configured to judge whether a road surface on which the vehicle is running is at least a low friction coefficient road surface, and
   wherein the antilock braking controlling module performs the turning pressure reduction control only in the case that the road surface is judged to be the low friction coefficient road surface, and
   wherein the road surface friction coefficient judging module includes:
     a first estimating module configured to estimate a first road surface friction coefficient based on a lateral acceleration;

a second estimating module configured to estimate a second road surface friction coefficient based on a longitudinal acceleration; and a selecting module configured to select either the first road surface friction coefficient or the second road surface friction coefficient as a road surface friction coefficient of the road surface, wherein the selecting module has a limit steering judgment section configured to judge whether steering exceeding the limit of road surface conditions is performed based on at least the steering angle and the vehicle speed, and wherein the selecting module selects:

the first road surface friction coefficient or the second road surface friction coefficient, whichever smaller, as the road surface friction coefficient when limit steering judgment section judges that steering exceeding the limit of road surface conditions is performed; and the second road surface friction coefficient as the road surface friction coefficient when limit steering judgment section judges that steering exceeding the limit of road surface conditions is not performed.

2. The controller of claim 1, further including:

a turning state judging module configured to judge whether the vehicle is in an under- steering state, a neutral-steering state or an over-steering state, wherein the antilock braking controlling module performs:

the turning pressure reduction control only for the front wheels in the case that the turning state judging module judges that the vehicle is in the under-steering state;

the turning pressure reduction control for the front wheels and the rear wheels in the case that the turning state judging module judges that the vehicle is in the neutral-steering state; and the turning pressure reduction control only for the rear wheels in the case that the turning state judging module judges that the vehicle is in the over-steering state.

3. The controller of claim 2, wherein, in the turning pressure reduction control that is performed only for the front wheels in the under-steering state, and the pressure reduction amount is adjusted to be larger more than at the neutral-steering state.

4. The controller of claim 2, wherein, in the turning pressure reduction control that is performed only for the front wheels in the under-steering state.

5. The controller of claim 2, wherein, in the turning pressure reduction control that is performed only for the rear wheels in the over-steering state, and the pressure reduction amount is adjusted to be larger than at the neutral-steering state.

6. The controller of claim 2, wherein the turning state judging module includes:

a normative yaw rate calculation section configured to calculate a normative yaw rate using the steering angle and the vehicle speed;

a road surface limit yaw rate calculation section configured to calculate a road surface limit yaw rate using a lateral acceleration and the vehicle speed; and a target yaw rate calculation section configured to calculate a target yaw rate from the normative yaw rate and the road surface limit yaw rate, wherein the turning state judging module compares the target yaw rate with an actual yaw rate actually applied to the vehicle to thereby judge:

that the vehicle is in the under-steering state in the case that the actual yaw rate is smaller than a value obtained by subtracting a first given value from the target yaw rate;

that the vehicle is in the over-steering state in the case that the actual yaw rate is larger than a value obtained by adding a second given value to the target yaw rate; and that the vehicle is in the neutral-steering state in the case that the vehicle is not judged to be in the under-steering state or the over-steering state.

7. The controller of claim 1, wherein the slip-related amount is a slip amount obtained by subtracting the wheel speed from the vehicle speed, and wherein, when the slip amount becomes larger than the pressure reduction threshold value, the antilock braking controlling module reduces the brake hydraulic pressure applied to the wheel brakes.

8. The controller of claim 1, wherein the road surface friction coefficient judging module further includes:

a low friction coefficient ($\mu$) road judging module configured to judge that the road surface is the low friction coefficient road surface when the road surface friction coefficient selected by the selecting module is smaller than a fourth given value.

9. The controller of claim 1, wherein the limit steering judgment section includes:

a normative yaw rate calculation section configured to calculate a normative yaw rate from the steering angle and the vehicle speed;

a road surface limit yaw rate calculation section configured to calculate a road surface limit yaw rate from a lateral acceleration and the vehicle speed; and a yaw rate judgment section configured to judge whether the deviation obtained by subtracting the road surface limit yaw rate from the normative yaw rate is larger than a third given value, and wherein the limit steering judgment section judges:

that steering exceeding the limit of road surface conditions is performed in the case that the deviation is larger than the third given value; and that steering exceeding the limit of road surface conditions is not performed in the case that the deviation is not larger than the third given value.

10. The controller of claim 1, wherein the first estimating module calculates the first road surface friction coefficient from a lateral acceleration filter value obtained by performing a filtering process.

11. The controller of claim 1, wherein the road surface friction coefficient judging module further includes:

a low friction coefficient ($\mu$) road judging module configured to judge whether the road surface is the low friction coefficient road surface, wherein the low μ road judging module includes:
- a first judgment section configured to judge whether a first condition that the road surface friction coefficient is smaller than a fourth given value is satisfied; and
- at least one of a second judgment section configured to judge whether a second condition that an estimated lateral acceleration calculated based on an actual yaw rate actually applied to the vehicle is smaller than a fifth given value is satisfied, and a third judgment section configured to judge whether a third condition that a locking hydraulic pressure in the antilock braking control is smaller than a sixth given value is satisfied, and wherein the low μ road judging module judges that the road surface is the low friction coefficient road surface when the first condition and at least one of the second and third conditions are satisfied.

12. The controller of claim 11,
wherein the road surface friction coefficient judging module estimates the road surface friction coefficient using an actual lateral acceleration obtained by a lateral acceleration sensor.

13. The controller of claim 11,
wherein the second judgment section calculates:
- a tentatively estimated lateral acceleration obtained from the absolute value of the actual yaw rate and the vehicle speed; and
- the estimated lateral acceleration obtained by subjecting the tentatively estimated lateral acceleration to a filtering process.

14. The controller of claim 11,
wherein the third judgment section judges that the third condition is satisfied when the locking hydraulic pressures of the right front wheel and the left front wheel are respectively smaller than the sixth given value that is the same for all the wheels or different for the respective wheels.

15. The controller of claim 1, wherein the antilock braking controlling module sets an opening time of an outlet valve at the time of turning longer than an opening time at the time of straight running, whereby as a result, a pressure reduction timing at the time of turning is advanced from a pressure reduction timing at the time of straight running by making the pressure reduction threshold values smaller than those at the time of straight running, and the wheel speed made close to the vehicle speed by making the pressure reduction amounts larger than those at the time of straight running.

16. The controller of claim 15, wherein the antilock braking controlling module is configured to perform the turning pressure reduction control only when receiving a low friction coefficient signal from a road surface friction coefficient judging module.

17. A vehicle brake hydraulic controller including:
- an antilock braking controlling module configured to perform an antilock braking control in which a brake hydraulic pressure applied to wheel brakes is reduced under the condition that a slip-related amount has reached a pressure reduction threshold value, the slip-related amount being calculated using a vehicle speed and a wheel speed; and
- a turning judging module configured to judge whether a vehicle is turning based on a steering angle, wherein, when the antilock braking control is performed and in the case that the turning judging module judges that the vehicle is turning, the antilock braking controlling module performs a turning pressure reduction control so as to:
- change the pressure reduction threshold values at the time of turning smaller than the pressure reduction threshold values at the time of straight running, wherein the pressure reduction threshold value at the time of straight running is a first threshold value, the pressure reduction threshold value at the time of turning is a second threshold value, and the first threshold value is larger than the second threshold value, wherein the antilock braking controlling module sets an opening time of an outlet valve at the time of turning longer than an opening time at the time of straight running, whereby as a result, a pressure reduction timing at the time of turning is advanced from a pressure reduction timing at the time of straight running by making the pressure reduction threshold values smaller than those at the time of straight running, and the wheel speed made close to the vehicle speed by making the pressure reduction amounts larger than those at the time of straight running, wherein the antilock braking controlling module is configured to perform the turning pressure reduction control only when receiving a low friction coefficient signal from a road surface friction coefficient judging module, and wherein
in an under-steering state, the pressure reduction threshold value of front wheels is set to a value (Sf3) smaller than a value (Sf1) at the time of straight running, and the pressure reduction amount of the front wheels is set to a value (Pf3) larger than a value (Pf1) at the time of straight running;
both the pressure reduction threshold value and the pressure reduction amount of rear wheels are set to be equal to values (Sr1) and (Pr1) at the time of straight running, respectively;
in a neutral-steering state, the pressure reduction threshold values of the front and rear wheels are set to values (Sf2) and (Sr2) smaller than the values (Sf1) and (Sr1) at the time of straight running, and the pressure reduction amounts of the front and rear wheels are set to values (Pf2) and (Pr2) larger than the values (Pf1) and (Pr1) at the time of straight running;
in an over-steering state, the pressure reduction threshold value of the rear wheels is set to a value (Sr3) smaller than the value (Sr1) at the time of straight running, and the pressure reduction amount of the rear wheels is set to a value (Pr3) larger than the value (Pr1) at the time of straight running; and
both the pressure reduction threshold value and the pressure reduction amount of the front wheels are set to be equal to the values (Sf1) and (Pf1) at the time of straight running.

18. The controller of claim 17, wherein:
the turning pressure reduction control is performed only for the front wheels in the under-steering state, wherein the pressure reduction threshold value is set to the value (Sf3) smaller than the pressure reduction threshold value (Sf2) of the front wheels in the neutral state, and the pressure reduction amount is set to the value (Pf3) larger than the pressure reduction amount (Pf2) of the front wheels in the neutral state;
the turning pressure reduction control is performed only for the rear wheels in the over-steering state, wherein the pressure reduction threshold value is set to the value (Sr3) smaller than the pressure reduction threshold value (Sr2) of the rear wheels in the neutral state, and the pressure reduction amount is set to the value (Pr3) larger than the pressure reduction amount (Pr2) of the rear wheels in the in the neutral state;

a difference between the pressure reduction threshold value in the neutral state and the pressure reduction threshold value at the time of straight running for the front wheels is nearly equal to a difference therebetween for the rear wheels; and a difference between the pressure reduction amount in the neutral state and the pressure reduction amount at the time of straight running for the front wheels is nearly equal to a difference therebetween for the rear wheels.

19. The controller of claim 1, wherein the selecting module selects the first road surface friction coefficient or the second road surface friction coefficient as the road surface friction coefficient depending on a judgment of a steering limit.

20. A vehicle brake hydraulic controller including:
an antilock braking controlling module configured to perform an antilock braking control in which a brake hydraulic pressure applied to wheel brakes is reduced under the condition that a slip-related amount has reached a pressure reduction threshold value, the slip-related amount being calculated using a vehicle speed and a wheel speed; and
a turning judging module configured to judge whether a vehicle is turning based on a steering angle,
wherein, when the antilock braking control is performed and in the case that the turning judging module judges that the vehicle is turning, the antilock braking controlling module performs a turning pressure reduction control so as to:
change the pressure reduction threshold value to thereby advance a start timing of the turning pressure reduction control compared to at the time of straight running; and
change the pressure reduction amounts to be larger than that at the time of straight running,
wherein the antilock braking controlling module performs the turning pressure reduction control only in the case that a road surface is judged to be a low friction coefficient road surface, and further comprising:
a selecting module configured to select either a first road surface friction coefficient or a second road surface friction coefficient as a road surface friction coefficient of the road surface, wherein:
the selecting module has a limit steering judgment section configured to judge whether steering exceeding the limit of road surface conditions is performed based on at least the steering angle and the vehicle speed, and
the selecting module selects:
the first road surface friction coefficient or the second road surface friction coefficient, whichever smaller, as the road surface friction coefficient when the limit steering judgment section judges that steering exceeds the limit of road surface conditions is performed; and
the second road surface friction coefficient as the road surface friction coefficient when the limit steering judgment section judges that steering exceeds the limit of road surface conditions is not performed.

21. The controller of claim 20, wherein a pressure reduction timing at the time of turning is advanced from a pressure reduction timing at the time of straight running by making the pressure reduction threshold values smaller than those at the time of straight running, and the wheel speed made close to the vehicle speed by making the pressure reduction amounts larger than those at the time of straight running.

22. A vehicle brake hydraulic controller including:
an antilock braking controlling module configured to perform an antilock braking control in which a brake hydraulic pressure applied to wheel brakes is reduced under the condition that a slip-related amount has reached a pressure reduction threshold value, the slip-related amount being calculated using a vehicle speed and a wheel speed; and
a turning judging module configured to judge whether a vehicle is turning based on a steering angle,
wherein, when the antilock braking control is performed and in the case that the turning judging module judges that the vehicle is turning, the antilock braking controlling module performs a turning pressure reduction control so as to:
change the pressure reduction threshold value to thereby advance a start timing of the turning pressure reduction control compared to at the time of straight running; and
change the pressure reduction amounts to be larger than that at the time of straight running,
wherein a pressure reduction timing at the time of turning is advanced from a pressure reduction timing at the time of straight running by making the pressure reduction threshold values smaller than those at the time of straight running, and the wheel speed made close to the vehicle speed by making the pressure reduction amounts larger than those at the time of straight running, and
wherein:
in an under-steering state, the pressure reduction threshold value of front wheels is set to a value (Sf3) smaller than a value (Sf1) at the time of straight running, and the pressure reduction amount of the front wheels is set to a value (Pf3) larger than a value (Pf1) at the time of straight running;
both the pressure reduction threshold value and the pressure reduction amount of rear wheels are set to be equal to values (Sr1) and (Pr1) at the time of straight running, respectively;
in a neutral-steering state, the pressure reduction threshold values of the front and rear wheels are set to values (Sf2) and (Sr2) smaller than the values (Sf1) and (Sr1) at the time of straight running, and the pressure reduction amounts of the front and rear wheels are set to values (Pf2) and (Pr2) larger than the values (Pf1) and (Pr1) at the time of straight running;
in an over-steering state, the pressure reduction threshold value of the rear wheels is set to a value (Sr3) smaller than the value (Sr1) at the time of straight running, and the pressure reduction amount of the rear wheels is set to a value (Pr3) larger than the value (Pr1) at the time of straight running; and
both the pressure reduction threshold value and the pressure reduction amount of the front wheels are set to be equal to the values (Sf1) and (Pf1) at the time of straight running.

23. The controller of claim 21, wherein the antilock braking controlling module is configured to perform the antilock braking control in which a brake hydraulic pressure applied to four wheel brakes.

24. The controller of claim 1, wherein the antilock braking controlling module is configured to perform the antilock braking control in which a brake hydraulic pressure applied to four wheel brakes.

* * * * *